(12) United States Patent
Eger et al.

(10) Patent No.: US 11,539,565 B2
(45) Date of Patent: Dec. 27, 2022

(54) HYBRID AUTOMATIC REPEAT REQUEST (HARQ) TECHNIQUES FOR REDUCING PEAK-TO-AVERAGE POWER RATIO (PAPR)

(71) Applicant: QUALCOMM Incorporated, San Diego, CA (US)

(72) Inventors: Ory Eger, Tel Aviv (IL); Guy Wolf, Rosh Haayin (IL); Assaf Touboul, Netanya (IL); Noam Zach, Kiryat Ono (IL); Sharon Levy, Binyamina (IL); Ori Ben Shahar, Petach Tikva (IL); Ran Berliner, Kfar-Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 170 days.

(21) Appl. No.: 17/153,315

(22) Filed: Jan. 20, 2021

(65) Prior Publication Data

US 2022/0231895 A1 Jul. 21, 2022

(51) Int. Cl.
*H04L 27/26* (2006.01)
*H04L 5/00* (2006.01)
*H04L 1/00* (2006.01)

(52) U.S. Cl.
CPC ........ *H04L 27/2614* (2013.01); *H04L 1/0041* (2013.01); *H04L 5/0055* (2013.01)

(58) Field of Classification Search
CPC . H04L 1/0041; H04L 27/2614; H04L 5/0055; H04L 27/2623; H04L 1/1819; Y02D 30/70
See application file for complete search history.

(56) References Cited

U.S. PATENT DOCUMENTS

| 6,512,758 B1 * | 1/2003 | Sato | H04L 27/2614 370/344 |
| 11,424,897 B2 * | 8/2022 | Eger | H04L 5/023 |
| 2002/0105947 A1 * | 8/2002 | Kitagawa | H04L 1/0045 370/236 |
| 2002/0181489 A1 * | 12/2002 | Kitagawa | H04L 27/2623 370/335 |
| 2002/0181610 A1 * | 12/2002 | Sumasu | H04L 27/2623 375/296 |

(Continued)

*Primary Examiner* — Michael J Moore, Jr.
*Assistant Examiner* — Hicham B Foud
(74) *Attorney, Agent, or Firm* — Harrity & Harrity, LLP

(57) ABSTRACT

This disclosure provides methods, devices and systems for reducing PAPR in wireless communications. Some implementations more specifically relate to suppressing the amplitudes of a data signal that exceed a threshold amplitude level. The data signal may represent transmit (TX) data associated with a hybrid automatic repeat request (HARQ) process. In some implementations, a transmitting device may detect one or more peaks associated with the data signal. The transmitting device may reduce the amplitudes of the samples associated with the detected peaks to produce the amplitude-suppressed data signal. The transmitting device may further generate peak suppression information indicating the amplitudes of one or more of the samples associated with the peaks. In response to receiving a NACK message, the transmitting device may transmit, to the receiving device, the peak suppression information, one or more coded bits representing the TX data (associated with the HARQ process), or any combination thereof.

30 Claims, 16 Drawing Sheets

(56) References Cited

U.S. PATENT DOCUMENTS

| | | | |
|---|---|---|---|
| 2005/0208906 A1* | 9/2005 | Miyoshi | H04L 1/1819 455/122 |
| 2006/0046764 A1* | 3/2006 | Ohba | H04L 27/2614 455/69 |
| 2006/0245345 A1* | 11/2006 | Li | H04L 27/2614 370/203 |
| 2007/0149242 A1* | 6/2007 | Kim | H04L 27/2647 455/515 |
| 2007/0254603 A1* | 11/2007 | Li | H04B 7/0632 455/88 |
| 2008/0043869 A1* | 2/2008 | Hamada | H04L 27/2614 375/260 |
| 2008/0292014 A1* | 11/2008 | Naito | H04L 5/0007 375/260 |
| 2009/0225898 A1* | 9/2009 | Abe | H04L 27/2623 375/296 |
| 2013/0202060 A1* | 8/2013 | Nishikawa | H04L 27/04 375/300 |
| 2019/0222371 A1* | 7/2019 | Sahin | H04L 27/3416 |
| 2021/0281457 A1* | 9/2021 | Eger | H04L 27/3411 |
| 2021/0328751 A1* | 10/2021 | Eger | H04L 27/2624 |
| 2021/0328752 A1* | 10/2021 | Eger | H04L 27/2614 |
| 2021/0409162 A1* | 12/2021 | Wolf | H04L 5/0055 |
| 2022/0231895 A1* | 7/2022 | Eger | H04L 5/0055 |

* cited by examiner

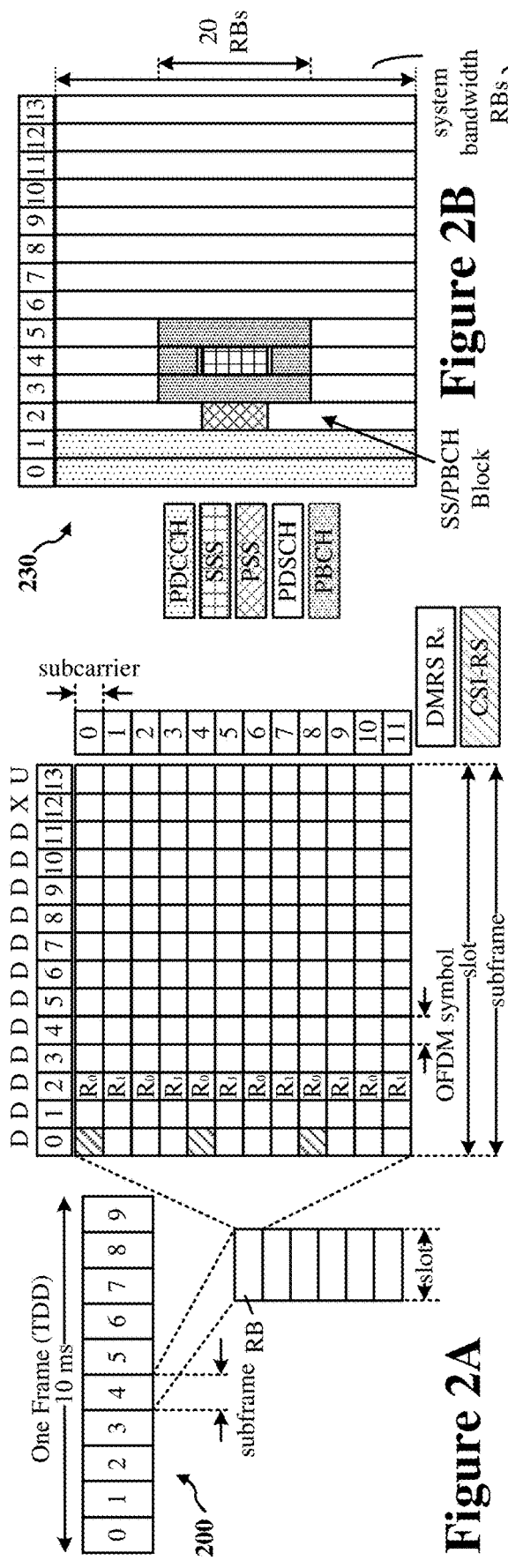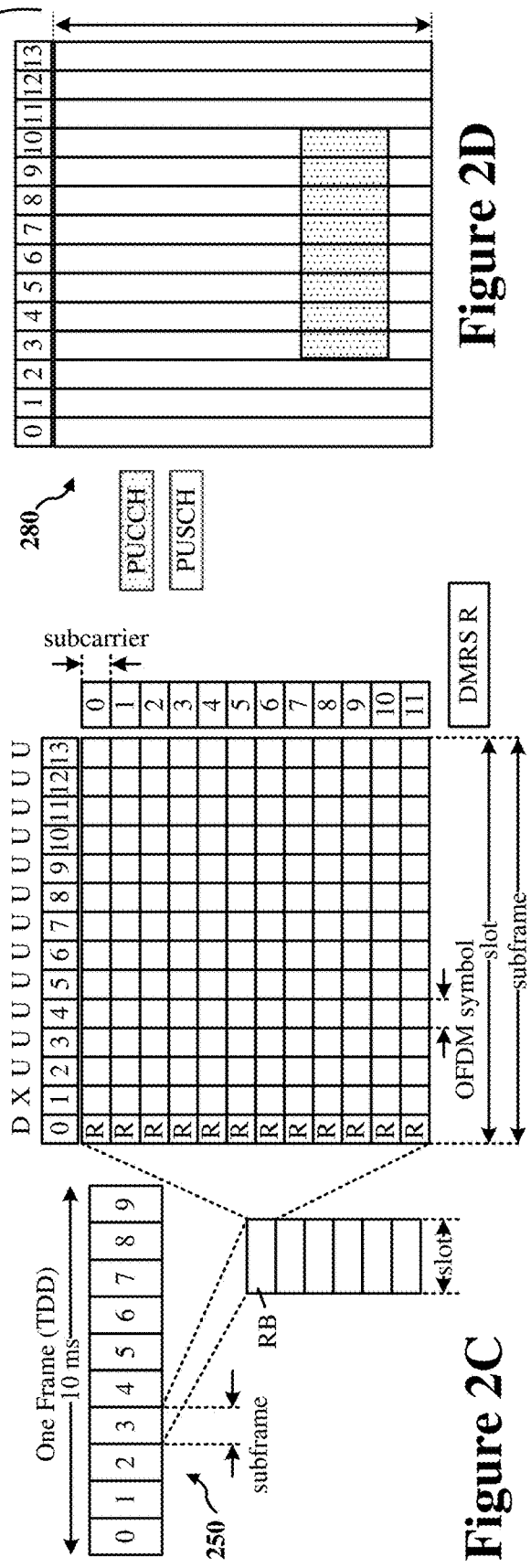

1110

```
┌─────────────────────────────────────────────────────────────────┐
│ Applying a Fourier transform to the peak suppression signal to  │
│ produce one or more peak suppression symbols. (1111)            │
└─────────────────────────────────────────────────────────────────┘
                                │
                                ▼
┌─────────────────────────────────────────────────────────────────┐
│ Demodulating the peak suppression symbols to recover peak       │
│ suppression information indicating the one or more peak         │
│ amplitude values. (1112)                                        │
└─────────────────────────────────────────────────────────────────┘
                                │
                                ▼
┌─────────────────────────────────────────────────────────────────┐
│ Recreating the samples associated with the one or more peak     │
│ amplitude values indicated in the peak suppression information. │
│ (1113)                                                          │
└─────────────────────────────────────────────────────────────────┘
                                │
                                ▼
┌─────────────────────────────────────────────────────────────────┐
│ Applying a Fourier transform to the recreated samples to        │
│ produce a portion of the reconstructed data symbols. (1114)     │
└─────────────────────────────────────────────────────────────────┘
```

Figure 11B

HYBRID AUTOMATIC REPEAT REQUEST (HARQ) TECHNIQUES FOR REDUCING PEAK-TO-AVERAGE POWER RATIO (PAPR)

TECHNICAL FIELD

This disclosure relates generally to wireless communication and, more specifically, to hybrid automatic repeat request (HARQ) techniques for reducing the peak-to-average power ratio (PAPR) of wireless transmissions.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency-division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR), which is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology.

For example, 5G NR introduces higher-order constellations (such as 256 QAM, 1024 QAM, 4K QAM, or 16K QAM, among other examples) which require low error vector magnitude (EVM) to ensure accurate data recovery. EVM is a measure of the distance between the points on a constellation and their ideal locations. Because each constellation point represents a different phase and amplitude combination, to ensure low EVM, the power amplifier of the transmitter should have an operating range large enough to represent the range of amplitudes in a data signal to be transmitted. However, OFDMA signaling techniques tend to yield high peak-to-average power ratios (PAPRs) compared to single-carrier signaling techniques, which may significantly increase power consumption while reducing the efficiency of the power amplifier at the transmitter. Thus, it is desirable to reduce the power consumption of the transmitter while maintaining low EVM at the receiver.

SUMMARY

The systems, methods and devices of this disclosure each have several innovative aspects, no single one of which is solely responsible for the desirable attributes disclosed herein.

One innovative aspect of the subject matter described in this disclosure can be implemented as a method of wireless communication. The method may be performed by a wireless communication device, and may include obtaining a plurality of information bits to be transmitted to a receiving device; encoding the plurality of information bits as a codeword based on a forward error correcting (FEC) code; mapping at least a portion of the codeword to a plurality of first data symbols based on a first modulation scheme; applying an inverse Fourier transform to the plurality of first data symbols to produce a first time-domain data signal; detecting one or more first peaks associated with the first data signal, where each of the one or more first peaks represents a respective sample of the first data signal having an amplitude that exceeds a threshold amplitude level; reducing the amplitudes of the samples associated with the one or more first peaks to produce an amplitude-suppressed data signal; transmitting the amplitude-suppressed data signal, over a wireless channel, to the receiving device; receiving a negative acknowledgement (NACK) message from the receiving device responsive to the amplitude-suppressed data signal; and transmitting, to the receiving device, peak suppression information or a number of bits of the codeword based on the received NACK message, where the peak suppression information indicates the amplitudes of one or more of the samples associated with the one or more first peaks.

In some implementations, the peak suppression information may further indicate phases or positions of the samples associated with the one or more first peaks. In some implementations, the method may further include determining an average transmit power associated with the first data signal and determining the threshold amplitude level based at least in part on the average transmit power and a target peak-to-average power ratio (PAPR). In some implementations, the amplitudes of the samples associated with the one or more first peaks may be reduced to a first amplitude value that is less than or equal to the threshold amplitude level. In some implementations, the method may further include selecting the bits of the codeword based on a hybrid automatic repeat request (HARQ) process. In some implementations, the bits of the codeword may be transmitted without the peak suppression information responsive to the NACK message. In some other implementations, the bits of the codeword may be transmitted with the peak suppression information responsive to the NACK message.

In some implementations, the transmitting of the bits of the codeword with the peak suppression information may include mapping the bits of the codeword to a plurality of second data symbols based on the first modulation scheme; applying an inverse Fourier transform to the plurality of second data symbols to produce a second time-domain data signal; mapping the peak suppression information to one or more peak suppression symbols based on a second modulation scheme; applying an inverse Fourier transform to the one or more peak suppression symbols to produce a peak suppression signal; and mapping the second data signal and the peak suppression signal to one or more orthogonal frequency-division multiplexing (OFDM) symbols of a communication subframe.

In some implementations, the method may further include detecting one or more second peaks associated with the second data signal, where each of the one or more second peaks represents a respective sample of the second data signal having an amplitude that exceeds the threshold amplitude level; and reducing the amplitudes of the samples associated with the one or more second peaks prior to mapping the second data signal to the one or more OFDM symbols of the communication subframe.

In some implementations, the transmitting of the peak suppression information or the number of bits of the codeword may include determining a PAPR associated with the first data signal, a signal-to-noise ratio (SNR) associated with the amplitude-suppressed data signal, or one or more channel conditions associated with the wireless channel; and determining the number of samples or the number of bits based on the determined PAPR, SNR, or channel conditions.

Another innovative aspect of the subject matter described in this disclosure can be implemented in a wireless communication device. In some implementations, the wireless communication device may include at least one modem, at least one processor communicatively coupled with the at least one modem, and at least one memory communicatively coupled with the at least one processor and storing processor-readable code. In some implementations, execution of the processor-readable code by the at least one processor causes the wireless communication device to perform operations including obtaining a plurality of information bits to be transmitted to a receiving device; encoding the plurality of information bits as a codeword based on a FEC code; mapping at least a portion of the codeword to a plurality of first data symbols based on a first modulation scheme; applying an inverse Fourier transform to the plurality of first data symbols to produce a first time-domain data signal; detecting one or more first peaks associated with the first data signal, where each of the one or more first peaks represents a respective sample of the first data signal having an amplitude that exceeds a threshold amplitude level; reducing the amplitudes of the samples associated with the one or more first peaks to produce an amplitude-suppressed data signal; transmitting the amplitude-suppressed data signal, over a wireless channel, to the receiving device; receiving a NACK message from the receiving device responsive to the amplitude-suppressed data signal; and transmitting, to the receiving device, peak suppression information or a number of bits of the codeword based on the received NACK message, where the peak suppression information indicates the amplitudes of one or more of the samples associated with the one or more first peaks. In some implementations, the peak suppression information may further indicate phases or positions of the samples associated with the one or more first peaks.

Another innovative aspect of the subject matter described in this disclosure can be implemented as a method of wireless communication. The method may be performed by a wireless communication device, and may include receiving a first data signal from a transmitting device; applying a Fourier transform to the first data signal to produce a plurality of first data symbols representing at least a portion of a codeword associated with a FEC code; detecting one or more errors in the at least portion of the codeword; transmitting a NACK message to the transmitting device based on the detected errors; receiving, from the transmitting device, a peak suppression signal and a second data signal responsive to the NACK message, where the peak suppression signal represents one or more peak amplitude values associated with respective samples of the first data signal, and where the second data signal represents one or more second bits of the codeword; reconstructing the plurality of first data symbols based on the peak suppression signal; demodulating the reconstructed data symbols to recover a plurality of first bits of the codeword; and combining the plurality of first bits with the one or more second bits to reproduce the codeword.

In some implementations, the peak suppression information may further indicate phases or positions of the respective samples of the first data signal. In some implementations, the one or more peak amplitude values may represent amplitudes that exceed a threshold amplitude level. In some implementations, the reconstructing of the plurality of first data symbols may include applying a Fourier transform to the peak suppression signal to produce one or more peak suppression symbols; demodulating the peak suppression symbols to recover peak suppression information indicating the one or more peak amplitude values; recreating the samples associated with the one or more peak amplitude values indicated in the peak suppression information; and applying a Fourier transform to the recreated samples to produce a portion of the reconstructed data symbols. In some implementations, the plurality of first bits and the one or more second bits may be combined based on a HARQ process.

Another innovative aspect of the subject matter described in this disclosure can be implemented in a wireless communication device. In some implementations, the wireless communication device may include at least one modem, at least one processor communicatively coupled with the at least one modem, and at least one memory communicatively coupled with the at least one processor and storing processor-readable code. In some implementations, execution of the processor-readable code by the at least one processor causes the wireless communication device to perform operations including receiving a first data signal from a transmitting device; applying a Fourier transform to the first data signal to produce a plurality of first data symbols representing at least a portion of a codeword associated with a FEC code; detecting one or more errors in the at least portion of the codeword; transmitting a NACK message to the transmitting device based on the detected errors; receiving, from the transmitting device, a peak suppression signal and a second data signal responsive to the NACK message, where the peak suppression signal represents one or more peak amplitude values associated with respective samples of the first data signal, and where the second data signal represents one or more second bits of the codeword; reconstructing the plurality of first data symbols based on the peak suppression signal; demodulating the reconstructed data symbols to recover a plurality of first bits of the codeword; and combining the plurality of first bits with the one or more second bits to reproduce the codeword.

BRIEF DESCRIPTION OF THE DRAWINGS

FIGS. 2A, 2B, 2C, and 2D show examples of a first 5G/NR frame, downlink (DL) channels within a 5G/NR slot, a second 5G/NR frame, and uplink (UL) channels within a 5G/NR slot, respectively.

FIG. 11B shows a flowchart illustrating an example process for wireless communication that supports HARQ techniques for reducing PAPR according to some implementations.

DETAILED DESCRIPTION

Figure 1:
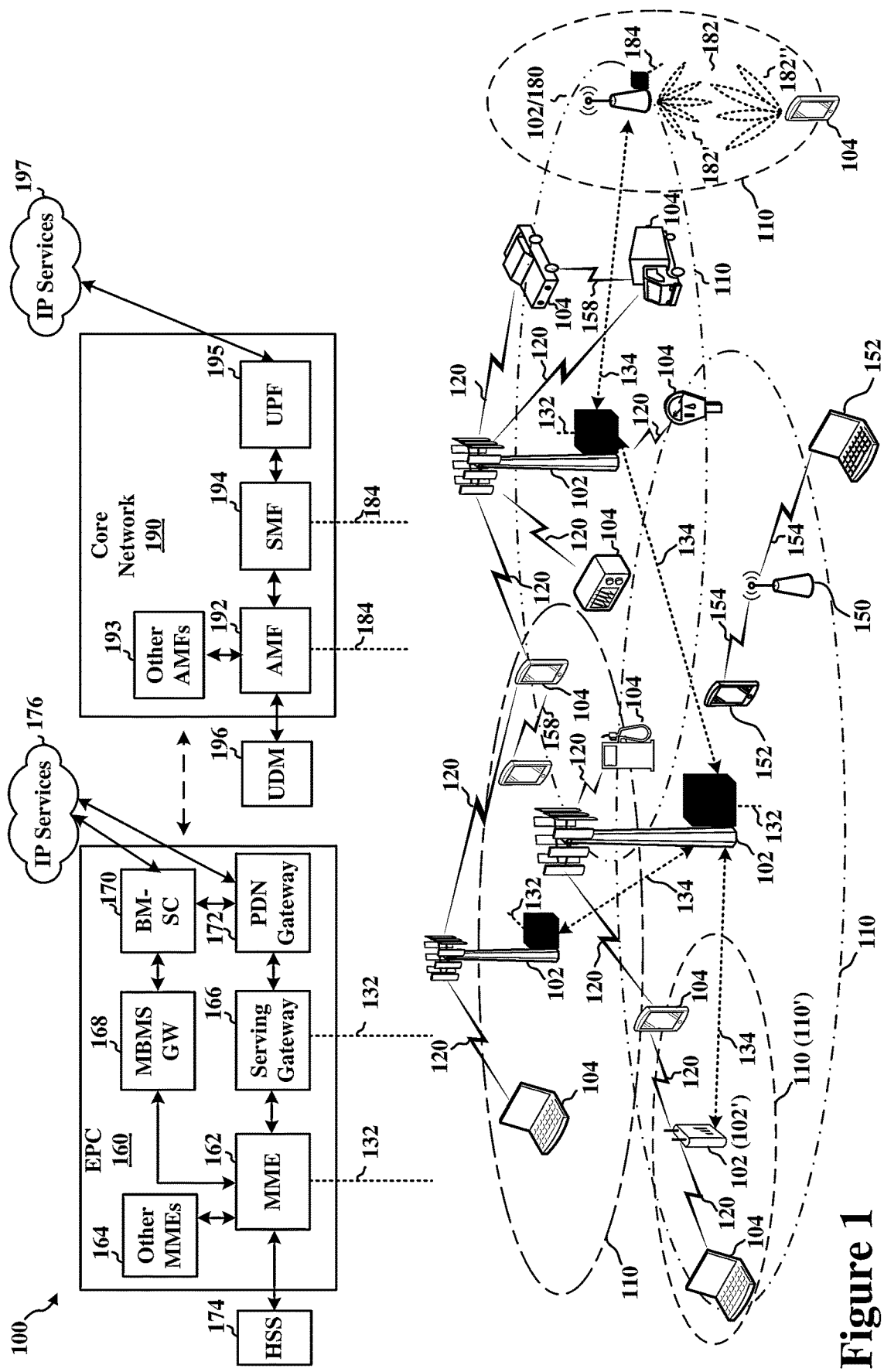
FIG. 1 shows a diagram of an example wireless communications system and an access network.

The following description is directed to some particular implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Long Term Evolution (LTE), 3G, 4G or 5G (New Radio (NR)) standards promulgated by the 3rd Generation Partnership Project (3GPP), the Institute of Electrical and Electronics Engineers (IEEE) 802.11 standards, the IEEE 802.15 standards, or the Bluetooth® standards as defined by the Bluetooth Special Interest Group (SIG), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless wide area network (WWAN), a wireless personal area network (WPAN), a wireless local area network (WLAN), or an internet of things (IOT) network.

Various implementations relate generally to reducing power consumption in wireless communication devices. Some implementations more specifically relate to reducing a peak-to-average power ratio (PAPR) of a transmitting device by suppressing the amplitudes of a data signal that exceed a threshold amplitude level and transmitting the amplitude-suppressed data signal to a receiving device. The data signal may represent transmit (TX) data associated with a hybrid automatic repeat request (HARQ) process. In some implementations, a transmitting device may detect one or more peaks associated with the data signal. As used herein, the term "peak" refers to any sample of the data signal having an amplitude that exceeds a threshold amplitude level. In some aspects, the transmitting device may reduce the amplitudes of the samples associated with the detected peaks to produce the amplitude-suppressed data signal. In some other aspects, the transmitting device may generate peak suppression information indicating the amplitudes of one or more of the samples associated with the peaks. If the receiving device is unable to recover the TX data from the amplitude-suppressed data signal, it may transmit a negative acknowledgement (NACK) message to the transmitting device. In response to receiving a NACK message, the transmitting device may transmit, to the receiving device, the peak suppression information, one or more coded bits representing the TX data (associated with the HARQ process), or any combination thereof.

Particular implementations of the subject matter described in this disclosure can be implemented to realize one or more of the following potential advantages. By suppressing the amplitudes of detected peaks in a data signal, aspects of the present disclosure may significantly reduce the PAPR associated with wireless transmissions. The reduction in PAPR improves the power efficiency of the power amplifier and reduces power consumption by the transmitting device. Aspects of the present disclosure recognize that reducing the amplitudes of some of the samples of the data signal may degrade the error vector magnitude (EVM) at the transmitter, which may increase the difficulty of recovering the TX data from the amplitude-suppressed data signal. However, by transmitting a combination of peak suppression information with one or more coded bits (in response to a NACK), aspects of the present disclosure may significantly improve the likelihood that the receiving device will be able to recover the TX data from a subsequent iteration of the HARQ process. For example, the receiving device may use the peak suppression information to reconstruct the peaks of the previously-transmitted data signal and may use the additional coded bits to assist with forward error correction (FEC). As a result, the transmitting device may benefit from reduced PAPR while the receiving device may demodulate and decode the received data signals without any additional loss of gain or accuracy.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 shows a diagram of an example wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180, may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as a millimeter wave or mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIG. 2A shows an example of a first slot 200 within a 5G/NR frame structure. FIG. 2B shows an example of DL channels 230 within a 5G/NR slot. FIG. 2C shows an example of a second slot 250 within a 5G/NR frame structure. FIG. 2D shows an example of UL channels 280 within a 5G/NR slot. The 5G/NR frame structure may be FDD in which, for a particular set of subcarriers (carrier system bandwidth), slots within the set of subcarriers are dedicated for either DL or UL In other cases, the 5G/NR frame structure may be TDD in which, for a particular set of subcarriers (carrier system bandwidth), slots within the set of subcarriers are dedicated for both DL and UL. In the examples shown in FIGS. 2A and 2C, the 5G/NR frame structure is configured as TDD, with slot 4 being configured with slot format 28 (with mostly DL), where D indicates DL, U indicates UL, and X indicates that the slot is flexible for use between DL/UL, and slot 3 being configured with slot format 34 (with mostly UL). While slots 3 and 4 are shown with slot formats 34 and 28, respectively, any particular slot may be configured with any of the various available slot formats 0-61. Slot formats 0 and 1 are all DL and all UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). This format may also apply to a 5G/NR frame structure that is FDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\lambda$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\wedge\mu*15$ kKz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 $\mu$s.

A resource grid may be used to represent the frame structure. Each time slot includes a resource block (RB) (also referred to as a physical RB (PRB)) that extends across 12 consecutive subcarriers and across a number of symbols. The intersections of subcarriers and symbols of the RB define multiple resource elements (REs). The number of bits carried by each RE depends on the modulation scheme.

As illustrated in FIG. 2A, some of the REs carry a reference (pilot) signal (RS) for the UE. In some configurations, one or more REs may carry a demodulation RS (DM-RS) (indicated as Rx for one particular configuration, where 100× is the port number, but other DM-RS configurations are possible). In some configurations, one or more REs may carry a channel state information reference signal (CSI-RS) for channel measurement at the UE. The REs may also include a beam measurement RS (BRS), a beam refinement RS (BRRS), and a phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe or symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
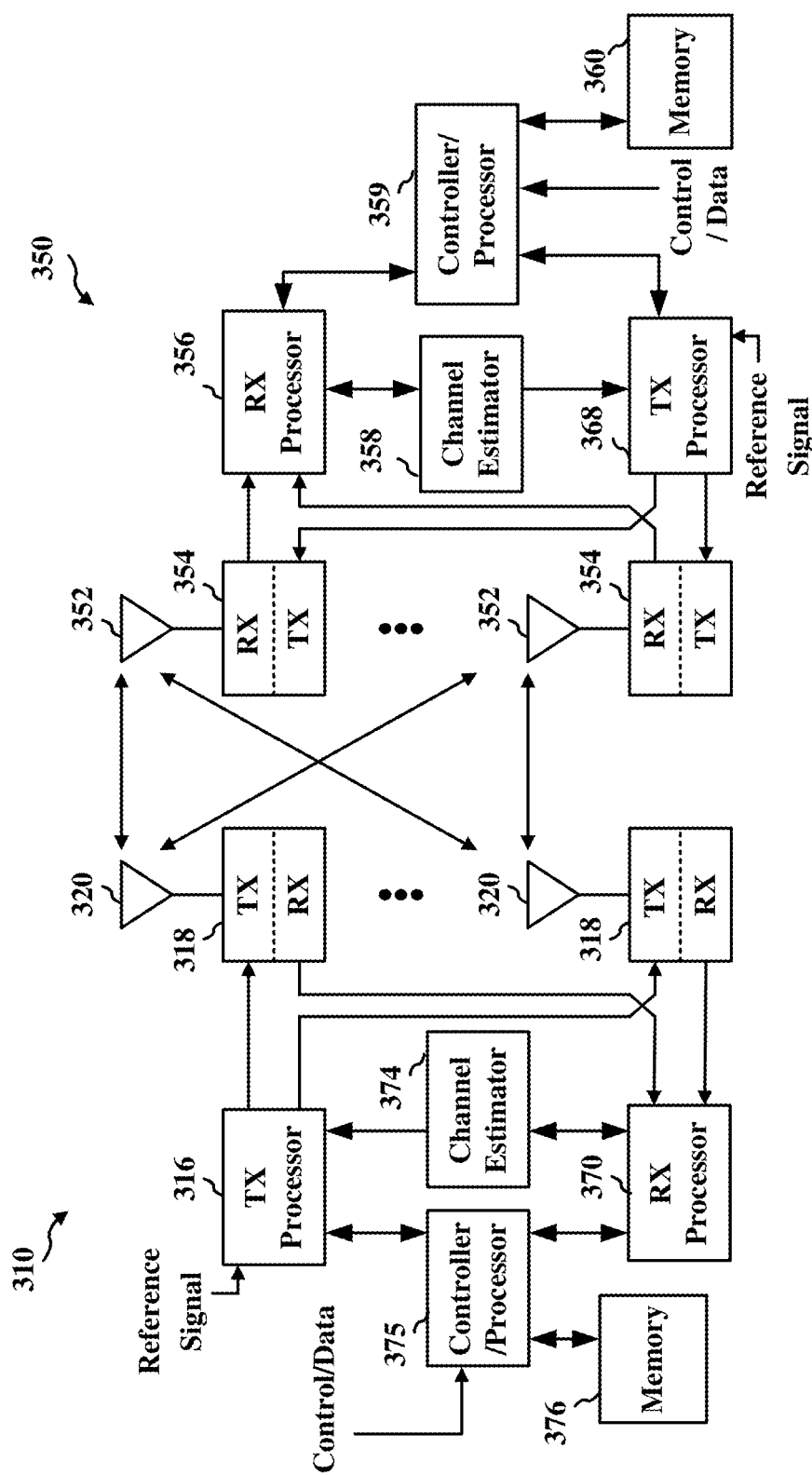
FIG. 3 shows a block diagram of an example base station and user equipment (UE) in an access network.

FIG. 3 shows a block diagram of an example base station 310 and UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially pre-coded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations. Information to be wirelessly communicated (such as for LTE or NR based communications) is encoded and mapped, at the PHY layer, to one or more wireless channels for transmission.

As described above, 5G NR introduces higher-order constellations (such as 256 QAM, 1024 QAM, 4K QAM, or 16K QAM, among other examples) which require low error vector magnitude (EVM) to ensure accurate data recovery. EVM is a measure of the distance between the points on a constellation and their ideal locations. Since each constellation point represents a different phase and amplitude combination, to ensure low EVM at a transmitter, the power amplifier of the transmitter should have a sufficiently large operating range to represent the range of amplitudes in a data signal to be transmitted. However, OFDMA signaling techniques tend to yield high peak-to-average power ratios (PAPRs) compared to single-carrier signaling techniques, which may significantly increase power consumption while reducing the efficiency of the power amplifier at the transmitter.

Various implementations relate generally to reducing power consumption in wireless communication devices. Some implementations more specifically relate to reducing a PAPR of a transmitting device by suppressing the amplitudes of a data signal that exceed a threshold amplitude level and transmitting the amplitude-suppressed data signal to a receiving device. The data signal may represent TX data associated with a HARQ process. In some implementations, a transmitting device may detect one or more peaks associated with the data signal. As used herein, the term "peak"

refers to any sample of the data signal having an amplitude that exceeds a threshold amplitude level. In some aspects, the transmitting device may reduce the amplitudes of the samples associated with the detected peaks to produce the amplitude-suppressed data signal. In some other aspects, the transmitting device may generate peak suppression information indicating the amplitudes of one or more of the samples associated with the peaks. If the receiving device is unable to recover the TX data from the amplitude-suppressed data signal, it may transmit a NACK message to the transmitting device. In response to receiving a NACK message, the transmitting device may transmit, to the receiving device, the peak suppression information, one or more coded bits representing the TX data (associated with the HARQ process), or any combination thereof.

Particular implementations of the subject matter described in this disclosure can be implemented to realize one or more of the following potential advantages. By suppressing the amplitudes of detected peaks in a data signal, aspects of the present disclosure may significantly reduce the PAPR associated with wireless transmissions. The reduction in PAPR improves the power efficiency of the power amplifier and reduces power consumption by the transmitting device. Aspects of the present disclosure recognize that reducing the amplitudes of some of the samples of the data signal may degrade the EVM at the transmitter, which may increase the difficulty of recovering the TX data from the amplitude-suppressed data signal. However, by transmitting a combination of peak suppression information with one or more bits associated with the TX data (in response to a NACK), aspects of the present disclosure may significantly improve the likelihood that the receiving device will be able to recover the TX data from a subsequent iteration of the HARQ process. For example, the receiving device may use the peak suppression information to reconstruct the peaks in the previously-transmitted data signal and may use the additional coded bits to assist with forward error correction (FEC). As a result, the transmitting device may benefit from reduced PAPR while the receiving device may demodulate and decode the received data signals without any additional loss of gain or accuracy.

Figure 4:
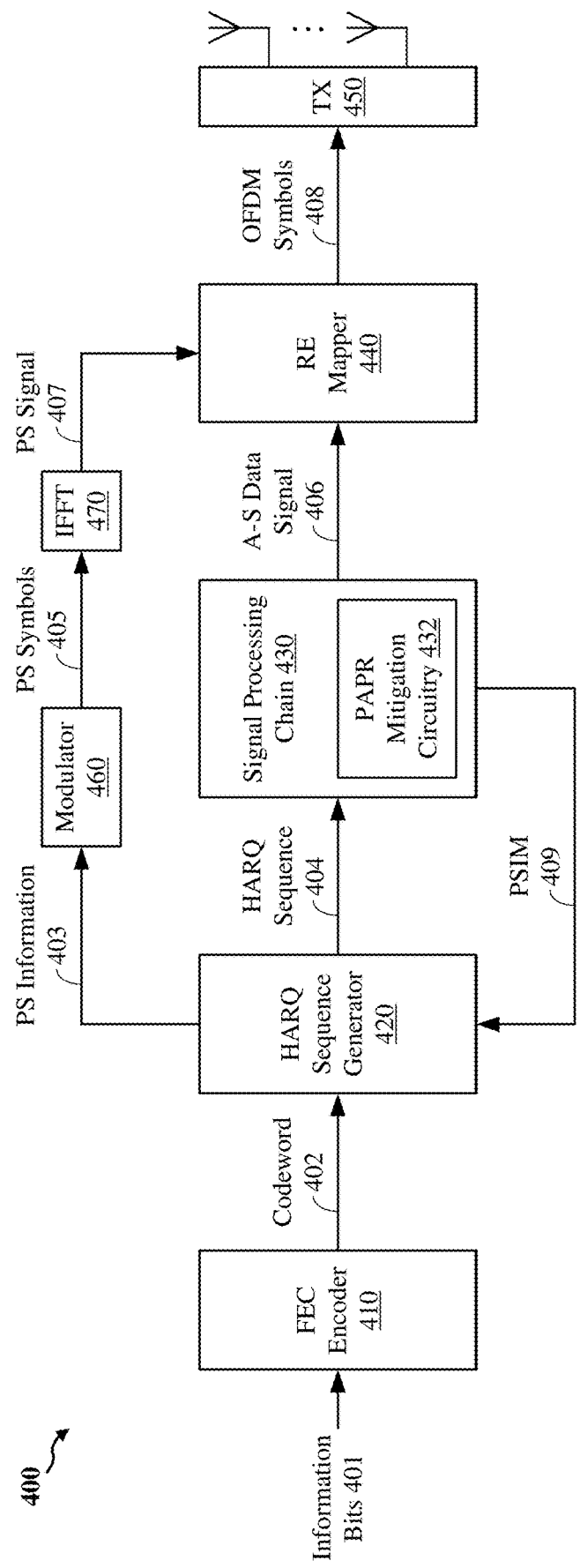
FIG. 4 shows an example transmit (TX) chain of a wireless communication device according to some implementations.

FIG. 4 shows an example TX chain 400 of a wireless communication device according to some implementations. The wireless communication device is also referred to herein as a transmitting device. In some implementations, the transmitting device may be a base station, such as base stations 102 or 310 of FIGS. 1 and 3, respectively. With reference for example to FIG. 3, the TX chain 400 may be an example of the TX processor 316 and the transmitter 318TX. In some other implementations, the transmitting device may be a UE, such as UEs 104 or 350 of FIGS. 1 and 3, respectively. With reference for example to FIG. 3, the TX chain 400 may be an example of the TX processor 368 and the transmitter 354TX.

The TX chain 400 includes a forward error correction (FEC) encoder 410, a hybrid automatic repeat request (HARQ) sequence generator 420, a signal processing chain 430, a transmitter (TX) 440, a resource element (RE) mapper 450, a modulator 460, and an inverse fast Fourier transform (IFFT) 470. The FEC encoder 410 receives a set of information bits 401 representing data to be transmitted to a receiving device (referred to herein as "TX data") and encodes the information bits 401 as a codeword 402 based on a FEC code. In some implementations, the FEC code may be a systematic code such as, for example, a low-density parity check (LDPC) code. As such, the FEC encoder 410 may add redundancy (in the form of one or more parity bits) to the information bits 401 during the encoding operation. The parity bits add redundancy to the TX data, for forward error correction purposes, without changing the TX data. Thus, the resultant codeword 402 includes the original information bits 401 in addition to the parity bits.

The HARQ sequence generator 420 is configured to generate a sequence of bits ("HARQ sequence") 404 to be transmitted (or retransmitted) to a receiving device based on one or more bits of the codeword 402. More specifically, the HARQ sequence generator 420 may determine the HARQ sequence 404 based on a HARQ process associated with the TX data. HARQ is a feedback mechanism by which a receiving device may request retransmission of data that was received in error. For example, the receiving device may transmit a negative acknowledgement (NACK) message to the transmitting device if it is unable to recover the TX data after performing forward error correction. The transmitting device may retransmit the data to the receiving device in response to receiving the NACK message. A HARQ process defines a number of transmissions (and retransmissions) associated with the same set TX data. Some HARQ techniques may utilize soft combining, which enables the receiving device to buffer and combine portions of the received data to reduce the number of retransmissions needed to reconstruct or recover the TX data.

In some implementations, the HARQ sequence generator 420 may select the bits of the HARQ sequence 404 from one or more bits of the codeword 402. For example, with forward error correction, the receiving device may be able to recover the TX data from only a subset of bits of the codeword 402. Thus, in some aspects, the HARQ sequence generator 420 may puncture one or more bits of the codeword 402 to produce the HARQ sequence 404 (such as to reduce the overhead of the transmission). The signal processing chain 430 is configured to convert the HARQ sequence 404 to a time-varying data signal. In some implementations, the signal processing chain 430 may include PAPR mitigation circuitry 432 configured to clip or reduce one or more peak amplitudes of the data signal to produce an amplitude-suppressed (A-S) data signal 406. The PAPR mitigation circuitry 432 may further generate a peak suppression information message (PSIM) 409 indicating or describing the peaks of the A-S data signal 406.

Figure 5:
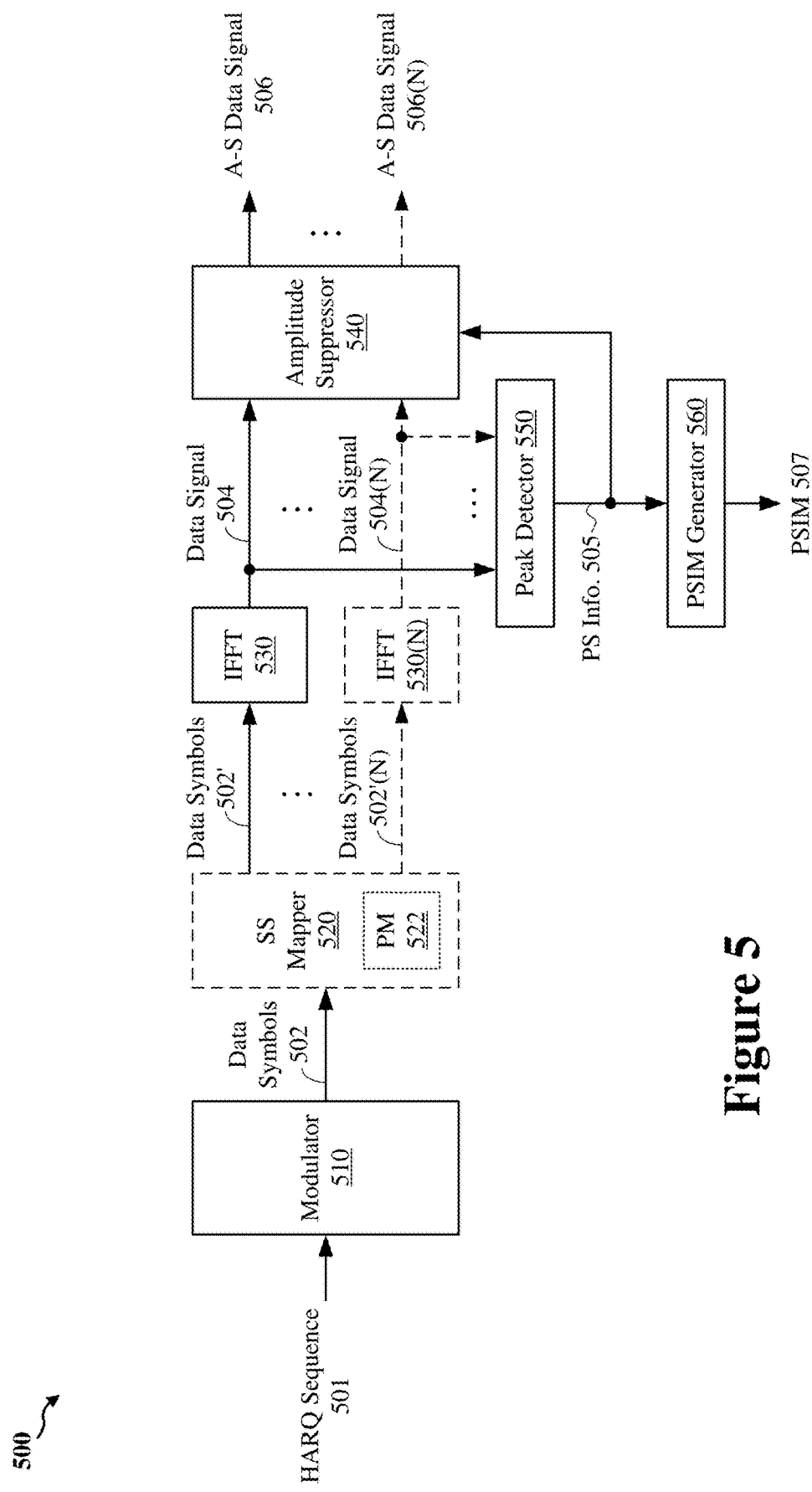
FIG. 5 shows an example signal processing chain of a wireless communication device according to some implementations.

FIG. 5 shows an example signal processing chain 500 of a wireless communication device according to some implementations. In some implementations, the signal processing chain 500 may be one example of the signal processing chain 430 of FIG. 4. In FIG. 5, solid lines depict data paths used for MIMO and non-MIMO implementations of the signal processing chain 500 whereas dotted (or phantom) lines depict additional data paths used only for MIMO implementations of the signal processing chain 500.

The signal processing chain 500 includes a modulator 510, an IFFT 530, an amplitude suppressor 540, a peak detector 550, and a PSIM generator 560. The modulator 510 receives a HARQ sequence 501 to be transmitted to a receiving device (such as the HARQ sequence 404 of FIG. 4) and modulates the HARQ sequence 501 onto a number of subcarriers to produce a sequence of data symbols 502. More specifically, the modulator 510 may map the HARQ sequence 501 to the data symbols 401 based on various digital modulation schemes. Example suitable modulation schemes include, but are not limited to, phase-shift keying (PSK) and quadrature amplitude modulation (QAM). Thus, each of the data symbols 401 may correspond to a point on a constellation graph of the in-phase (I) and quadrature (Q)

components of the modulated subcarriers. Each constellation point can be represented by a modulated amplitude and phase.

The IFFT 530 converts the data symbols 502 from the frequency domain to the time domain. For example, the IFFT 530 may produce a series of time-varying samples representative of the data symbols 502. In some aspects, the data symbols 502 may be parallelized (by a serial-to-parallel converter, not shown for simplicity) at the input of the IFFT 530, and the resulting samples may be serialized (by a parallel-to-serial converter, not shown for simplicity) at the output of the IFFT 530. The sequence of samples output by the IFFT 530 represents a time-domain data signal 504. In some instances, the data signal 504 may include one or more samples (or peaks) having amplitudes that are substantially higher than the average amplitude of the remaining samples. Such samples may be referred to herein as "peaks," and the amplitudes of the samples may be referred to as "peak amplitudes."

Figure 6A:
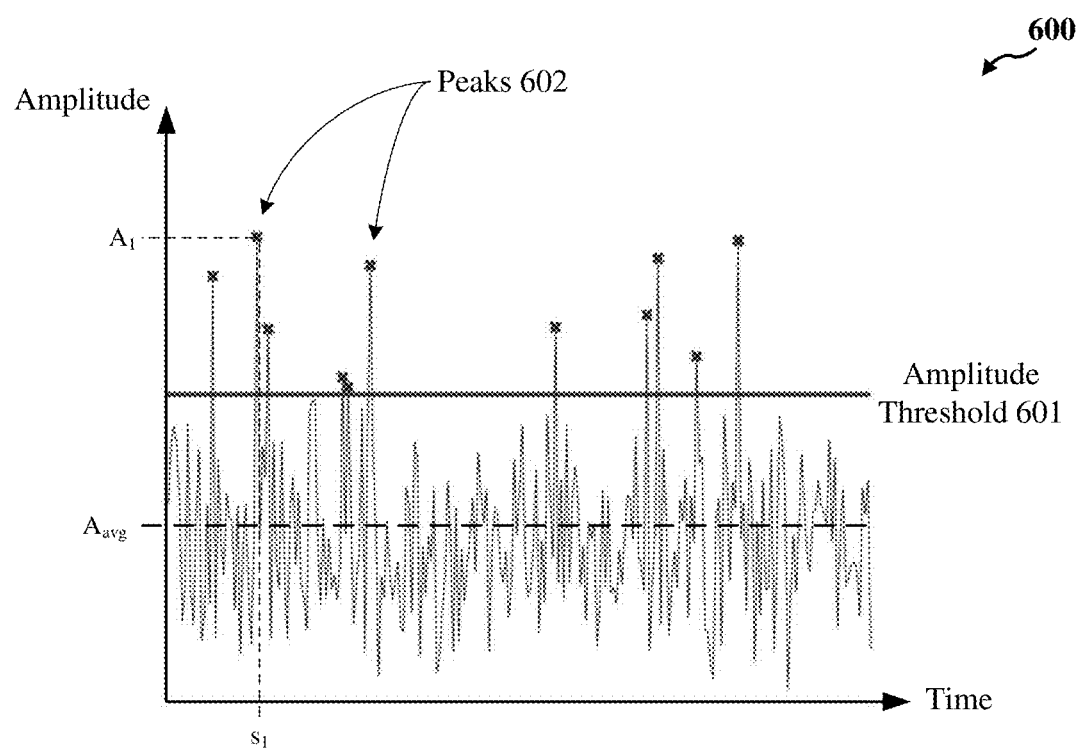
FIG. 6A shows an example data signal usable for communications between wireless communication devices according to some implementations.

FIG. 6A shows an example data signal 600 usable for communications between wireless communication devices according to some implementations. In some implementations, the data signal 600 may be one example of the data signal 504 of FIG. 5. As shown in FIG. 6A, the average amplitude ($A_{avg}$) of the data signal 600 is less than an amplitude threshold 601. In some implementations, the amplitude threshold 601 may be determined based, at least in part, on the average amplitude of the data signal 600 and a target or desired PAPR. For example, the amplitude threshold 601 may be chosen as a cut-off for limiting the PAPR of the data signal 600. The data signal 600 also includes a number of peaks 602. Although only two of the peaks 602 are highlighted in the example of FIG. 6A, the peaks 602 may include any samples of the data signal 600 having amplitudes that exceed the amplitude threshold 601. Each peak 602 may have a unique position ($s_n$) in the data signal 602, an amplitude ($A_n$), and a phase (not shown for simplicity). For example, the peak 602 at position $s_1$ has an amplitude $A_1$ that is significantly higher than the amplitude threshold 601. The presence of the peaks 602 may significantly increase the PAPR of the data signal 600.

In some implementations, the signal processing chain 500 may be configured to reduce or mitigate the PAPR of the data signal 504 by suppressing the amplitudes of one or more peaks. For example, the amplitude suppressor 540, peak detector 550, and PSIM generator 560, may be one example implementation of the PAPR mitigation circuitry 452 of FIG. 4. Specifically, the peak detector 550 may detect one or more peaks in the data signal 504 and generate peak suppression (PS) information 505 describing or otherwise indicating the detected peaks. With reference for example to FIG. 6A, the PS information 505 may indicate the positions ($s_n$), amplitudes ($A_n$), and phases (not shown) of the peaks 602. In some aspects, the PS information 505 may be provided to the amplitude suppressor 540. The amplitude suppressor 540 may adjust the data signal 504 by reducing or suppressing the amplitudes of the samples associated with the peaks. More specifically, the amplitude suppressor 540 may generate an A-S data signal 506 by replacing or substituting each of the peak amplitudes in the data signal 504 with a suppressed amplitude. In some implementations, the suppressed amplitude may be a known or preconfigured amplitude value that is less than or equal to a corresponding amplitude threshold.

Figure 6B:
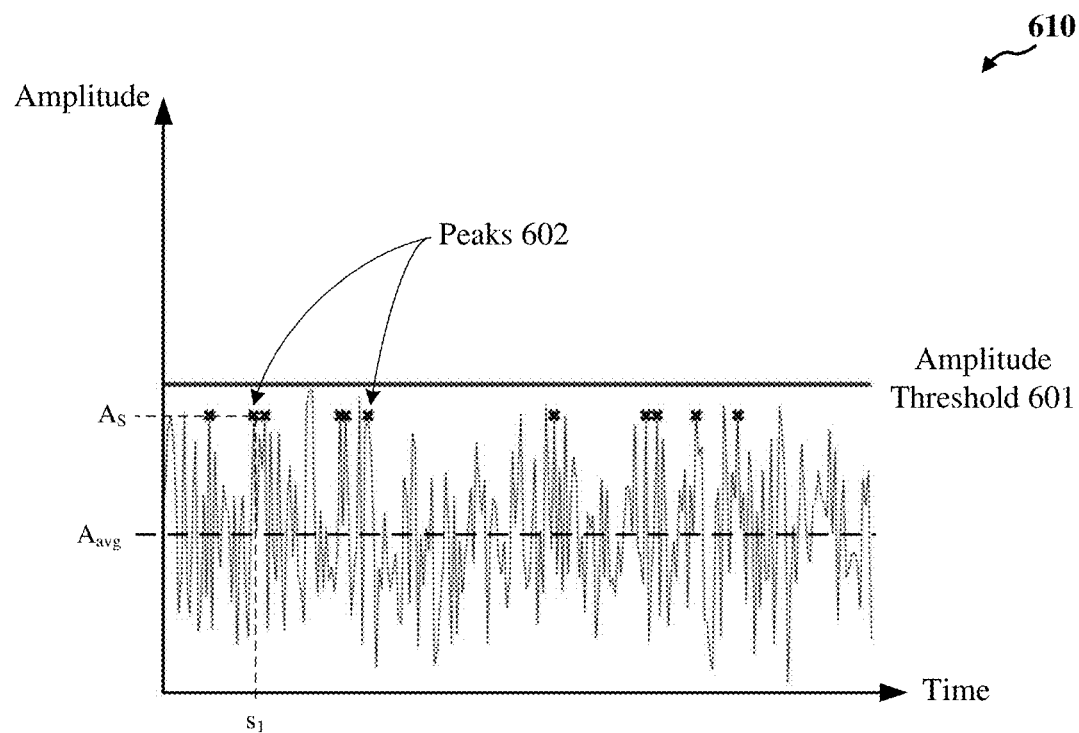
FIG. 6B shows another example data signal usable for communications between wireless communication devices according to some implementations.

FIG. 6B shows another example data signal 610 usable for communications between wireless communication devices according to some implementations. In some implementations, the data signal 610 may be one example of the A-S data signal 506 of FIG. 5. More specifically, the data signal 610 may be an example of the data signal 600, of FIG. 6A, after suppressing the amplitudes of the peaks 602. Compared to the data signal 600 of FIG. 6A, the amplitude of the data signal 610 never exceeds the amplitude threshold 601. More specifically, the amplitudes of the peaks 602 have been clipped or reduced to a suppressed amplitude value (As) in the data signal 610. In some implementations, each of the peaks 602 may be reduced to the same suppressed amplitude value. In some other implementations, different peaks 602 may be reduced to different suppressed amplitude values. The suppressed amplitude values may include any amplitude values less than or equal to the amplitude threshold 601. As a result, the PAPR of the data signal 610 is significantly lower than the PAPR of the data signal 600 of FIG. 6A.

In some implementations, the PSIM generator 560 may generate a peak suppression information message (PSIM) 507 based on the PS information 505. In some aspects, the PSIM 507 may include raw data representative of the PS information 505 (including the position, amplitude, and phase of each peak). In some other aspects, the PSIM 507 may be a compressed form of the PS information 505. For example, because the amplitude suppressor 540 does not alter the phases of the data signal 504 when generating the A-S data signal 506, the phase information may be excluded from the PSIM 507 to reduce the overhead of the message. The peak amplitudes also may be represented as polar amplitudes in the PSIM 507. By using the polar notation, the amplitudes of the peaks may be reduced without changing their phases. Other suitable compression techniques may include, but are not limited to, wavelet compression, per-antenna representation of the position of each peak, analog coding, and limiting the peak position vector to a number of known options. Still further, in some aspects, the PSIM generator 560 may compress the PS information 505 by quantizing the peak amplitudes into one or more quantization levels. For example, each quantization level may represent a range of peak amplitudes that can be associated with multiple peaks.

MIMO implementations of the signal processing chain 500 may additionally include a spatial stream (SS) mapper 520 and a number (N) of first IFFTs 530. The SS mapper 520 may maps the sequence of data symbols 502 to a number (N) of parallel streams. In some implementations, the SS mapper 520 may apply a precoding matrix (PM) 522 to the N parallel streams of data symbols 502 to produce a corresponding number (N) of pre-coded data symbols 502'. The pre-coded data symbols 502' may be weighted based on the precoding matrix 522 for optimal MIMO transmissions given the channel conditions of the wireless channel. In some implementations, the transmitting device may provide an indication of the precoding matrix 522 to the receiving device for purposes of reconstructing the data symbols 502. In some implementations, the indication may be transmitted in DCI messages on a per-slot basis. In some other implementations, the indication may be periodically transmitted in MAC control elements (CEs) after a given number (M) of slots.

Still further, in some implementations, the transmitting device may transmit a channel state information (CSI) reference signal (RS) to the receiving device. The receiving device may estimate the channel conditions of the wireless channel based on the CSI RS and report a precoding matrix indicator (PMI) back to the transmitting device indicating a recommended precoding matrix to be used given the channel conditions of the wireless channel. In some aspects, the transmitting device may use the precoding matrix recommended by the receiving device. Accordingly, the transmitting device may indicate, in the PDCCH, that the precoding matrix 522 is the same as (or matches) the recommended precoding matrix indicated by the PMI.

For MIMO implementations, the signal processing chain 500 may perform substantially the same operations as the non-MIMO implementations of the signal processing chain 500 on multiple concurrent or parallel streams of data symbols 502'. For example, the N IFFTs 530 may simultaneously convert N streams of data symbols 502' to N data signals 504, respectively. The peak detector 550 may generate PS information 505 for each of the N data signals 504. The amplitude suppressor 540 may use the PS information 505 to produce N A-S data signals 506 by suppressing peak amplitudes of the N data signals 504, respectively, and the PSIM generator 560 may generate a PSIM 507 based on the PS information 505.

Aspects of the present disclosure recognize that clipping or reducing the peak amplitudes of the data signal 504 may degrade EVM at the transmitter. For example, the EVM of the A-S data signal 506 may be worse than the EVM of the original data signal 504. However, in some instances, a receiving device may still be able to recover the TX data by demodulating and decoding the A-S data signal 506. In some implementations, the transmitting device may transmit the PSIM 507 to the receiving device only if the receiving device is unable to recover the TX data from the A-S data signal 506. In other words, during an initial transmission associated with a HARQ process, the transmitting device may transmit the A-S data signal 506 to the receiving device without the PSIM 507. If the receiving device is unable to recover the TX data, the transmitting device may include the PSIM 507 (or a subset of the information contained therein) in one or more subsequent retransmissions to the receiving device, for example, to compensate for the degradation in EVM of the A-S data signal 506.

With reference for example to FIG. 4, the A-S data signal 506 may be provided (as A-S data signal 406) to the RE mapper 440 and the PSIM 507 may be stored or buffered (as PSIM 409) by the HARQ sequence generator 420. The RE mapper 440 is configured to map the A-S data signal 406 to one or more OFDM symbols 408. The OFDM symbols 408 are provided to the transmitter 450 for transmission, over a wireless channel, to a receiving device. The transmitter 450 may include one or more power amplifiers to amplify the OFDM symbols 408 transmitted via one or more TX antennas. As described above, the operating range of the power amplifier may depend on the PAPR of the OFDM symbols 408. Because the A-S data signal 406 has a significantly lower PAPR than the original data signal, aspects of the present disclosure may improve the efficiency of the power amplifier while reducing the power consumption of the transmitting device.

The receiving device may attempt to recover the TX data from the received OFDM symbols 408. In some aspects, the receiving device may transmit an acknowledgement (ACK) message back to the transmitting device if it is able to successfully recover the TX data. In some other aspects, the receiving device may transmit a NACK message back to the transmitting device if it is unable to recover the TX data. The NACK message may be associated with a particular HARQ process. For example, the transmitting device may identify the TX data to be retransmitted to the receiving device based on the HARQ process associated with the received NACK message.

In some implementations, the transmitting device may respond to NACK messages from a receiving device by transmitting another HARQ sequence 404 to the receiving device. For example, the HARQ sequence generator 420 may select another set of bits of the codeword 402 (also referred to herein as "coded bits") to be retransmitted as the HARQ sequence 404. In some aspects, the HARQ sequence generator 420 may select the bits of the HARQ sequence 404 from the same set of coded bits for each transmission associated with a given HARQ process (such as with Chase combining techniques). In some other aspects, the HARQ sequence generator 420 may select the bits of the HARQ sequence 404 from a different set of coded bits for each transmission associated with a given HARQ process (such as with incremental redundancy techniques). The signal processing chain 430 converts the HARQ sequence 404 to an A-S data signal 406 and the RE mapper 440 maps the A-S data signal 406 to one or more OFDM symbols 408 for transmission by the transmitter 450. The retransmission of coded bits may improve the coding gain of the transmitted signal. However, in the present implementations, some failures to recover the TX data may be attributed to the clipping of peaks in the A-S data signal 406.

In some other implementations, the transmitting device may respond to NACK messages from a receiving device by transmitting peak suppression (PS) information 403 to the receiving device. For example, the HARQ sequence generator 420 may determine the PS information 403 based on the PSIM 409 associated with a previously-transmitted A-S data signal. The PS information 403 may indicate the positions, amplitudes, or phases of one or more peaks of the previously-transmitted A-S data signal. As described above, the PS information 403 may help compensate for the degradation in EVM of the previously-transmitted A-S data signal. The modulator 460 modulates the PS information 403 onto one or more subcarriers, in accordance with a digital modulation scheme (such as PSK or QAM), to produce respective PS symbols 405. The IFFT 470 converts the PS symbols 405 from the frequency domain to the time domain, to produce a series of time-varying samples representing a PS signal 407. The RE mapper 440 then maps the PS signal 407 to one or more OFDM symbols 408 for transmission by the transmitter 450.

Aspects of the present disclosure recognize that because the PS information 403 describes only the peaks of the A-S data signal 406, the PS signal 407 may be mapped to fewer OFDM symbols 408 than the A-S data signal 406. As a result, the PS signal 407 may occupy a relatively small number of the available REs in an OFDM subframe. In some implementations, the remaining REs of the OFDM subframe may be configured to carry one or more bits of the codeword 402. In other words, the transmitting device may respond to NACK messages from a receiving device by transmitting a combination of PS information 403 and a HARQ sequence 404. For example, the HARQ sequence generator 420 may select a number (X) of bits of the codeword 402 to be included in the HARQ sequence 404 and a number (Y) of peaks in the PSIM 409 to be represented by the PS information 403. In some implementations, the HARQ sequence generator 420 may determine the values for X and Y based on various factors such as, for example, a signal-to-noise ratio (SNR) of the A-S data signal 406, channel conditions of the wireless channel, or a PAPR of the original data signal.

The HARQ sequence 404 and PS information 403 are converted to an A-S data signal 406 and PS signal 407, respectively, and mapped to a number of OFDM symbols 408 of an OFDM subframe. In some implementations, the RE mapper 440 may map the A-S data signal 406 and PS signal 407 to different OFDM symbols of the same subframe. For example, the PS signal 407 may be carried on one OFDM symbol of an OFDM subframe and the A-S data signal 406 may be carried on one or more of the remaining OFDM symbols of the OFDM subframe. In some other implementations, the RE mapper 440 may map the A-S data signal 406 and the PS signal 407 to different REs within the same OFDM symbol using frequency domain multiplexing (FDM). For example, the PS signal 407 may be carried on a subset of subcarriers associated with a first OFDM symbol while the remaining subcarriers associated with the first OFDM symbol may be configured to carry the A-S data signal 406. In such implementations, the A-S data signal 406 also may be carried on one or more of the remaining OFDM symbols of the OFDM subframe.

Figure 7:
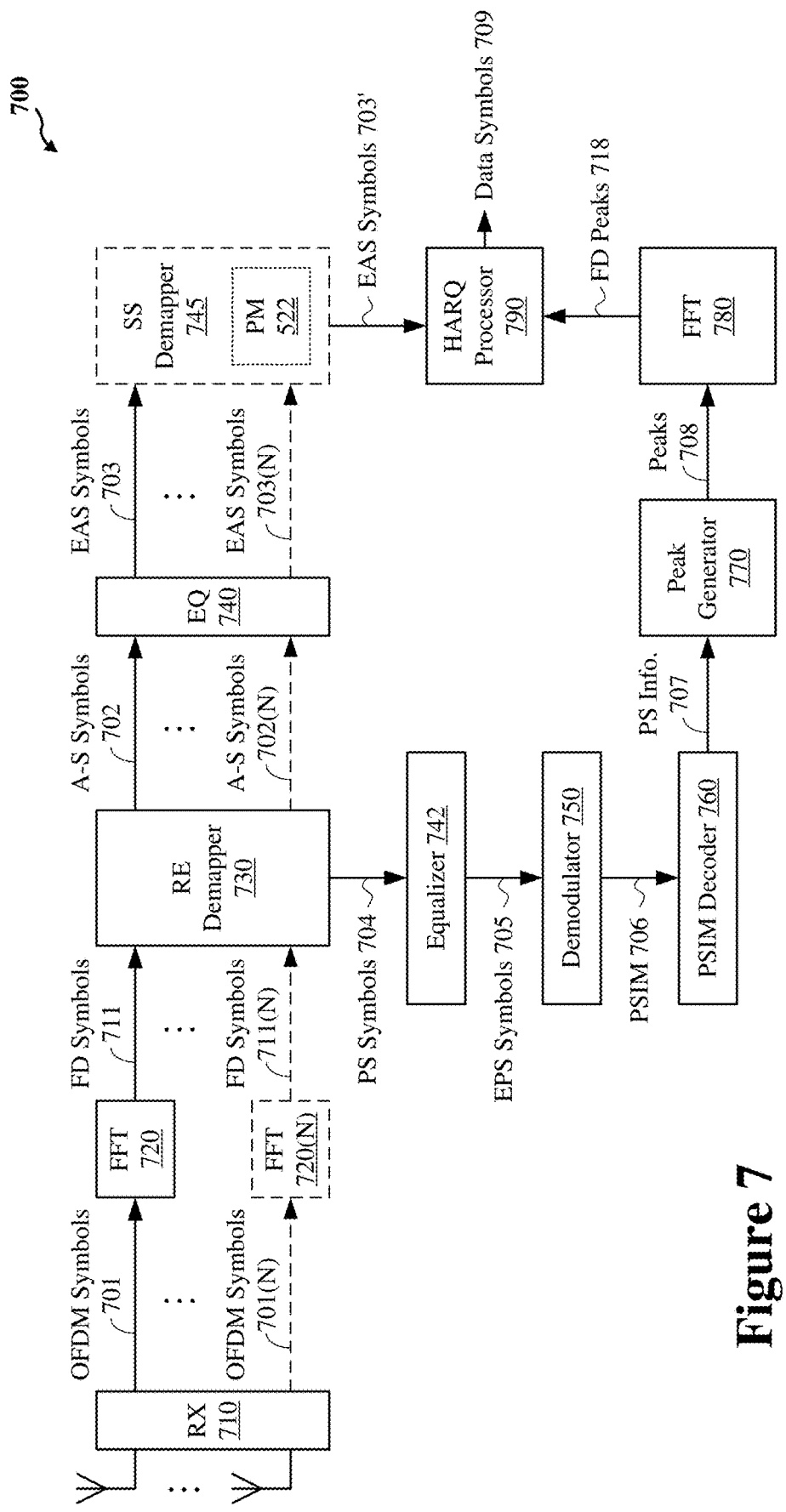
FIG. 7 shows an example receive (RX) chain of a wireless communication device according to some implementations.

FIG. 7 shows an example RX chain 700 of a wireless communication device according to some implementations. The wireless communication device is also referred to herein as a receiving device. In some implementations, the receiving device may be a UE, such as UEs 104 or 350 of FIGS. 1 and 3, respectively. With reference for example to FIG. 3, the RX chain 700 may be an example of the RX processor 356 and the receiver 354RX. In some other implementations, the receiving device may be a base station, such as base stations 102 or 310 of FIGS. 1 and 3, respectively. With reference for example to FIG. 3, the RX chain 700 may be an example of the RX processor 370 and the receiver 318RX. In FIG. 7, solid lines depict data paths used for MIMO and non-MIMO implementations of the RX chain 700 whereas dotted (or phantom) lines depict additional data paths used only for MIMO implementations of the RX chain 700.

The RX chain 700 includes a receiver (RX) 710, a first fast Fourier transform (FFT) 720, a resource element (RE) demapper 730, a first equalizer (EQ) 740, a second equalizer 742, a demodulator 750, a PSIM decoder 760, a peak generator 770, a second FFT 780, and a HARQ processor 790. The RX chain 700 may receive OFDM symbols 701 from a transmitting device. The OFDM symbols 701 may be received via one or more antennas of the receiver 710 and amplified by a low-noise amplifier (LNA) within the receiver 710. In some implementations, the OFDM symbols 701 may include an A-S data signal (such as the A-S data signal 406 of FIG. 4). In some other implementations, the OFDM symbols 701 may include a peak suppression signal (such as the PS signal 407). As described with reference to FIG. 4, the A-S data signal may be a data signal having clipped peaks. In other words, the amplitudes of samples associated with the peaks are reduced below a threshold amplitude level. The peak suppression signal includes information describing the peaks of a previously-received data signal (such as the amplitude, position, or phase of each peak).

The first FFT 720 converts the OFDM symbols 701 from the time domain to the frequency domain. For example, the FFT 720 may produce a series of frequency-domain (FD) symbols 711 representative of the amplitude-suppressed data signal or the peak suppression signal included in the received OFDM symbols 701. In some implementations, the resulting FD symbols 711 may include a sequence of amplitude-suppressed (A-S) symbols 702 representing an amplitude-suppressed data signal carried in the OFDM symbols 701. In some other implementations, the resulting FD symbols 711 may include peak suppression (PS) symbols 704 representing a peak suppression signal carried in the OFDM symbols 701. Still further, in some implementations, the resulting FD symbols 711 may include a combination of A-S symbols 702 and PS symbols 704. In some aspects, the OFDM symbols 701 may be parallelized (by a serial-to-parallel converter, not shown for simplicity) at the input of the FFT 720, and the resulting FD symbols 711 may be serialized (by a parallel-to-serial converter, not shown for simplicity) at the output of the FFT 720.

The RE demapper 730 is configured to parse (or demap) the A-S symbols 702 or the PS symbols 704 from the FD symbols 711. In some implementations, the RE demapper 730 may recover only A-S symbols 702 from FD symbols 711 representing an initial transmission for a given HARQ process. In some other implementations, the RE demapper 730 may recover A-S symbols 702 and PS symbols 704 from FD symbols 711 representing a retransmission for the HARQ process. For example, the RE demapper 730 may parse the PS symbols 704 from known portions of an OFDM subframe and may parse the A-S symbols 702 from remaining portions of the OFDM subframe. In some aspects, the RE demapper 730 may parse the PS symbols 704 from a different OFDM symbol than the A-S symbols 702. In some other aspects, the RE demapper 730 may parse the PS symbols 704 from an OFDM symbol that also carries at least a portion of the A-S symbols 702.

Figure 8A:
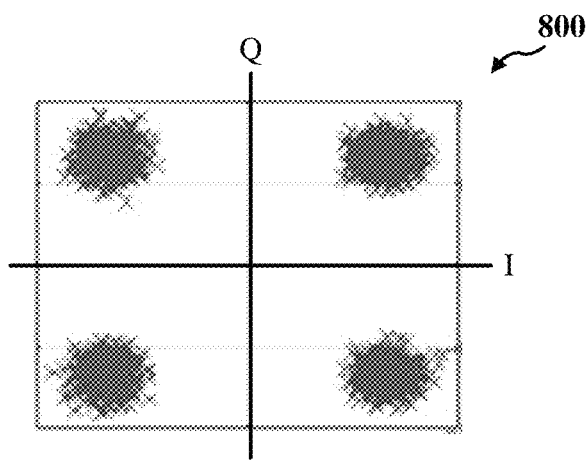
FIG. 8A shows a constellation depicting an example mapping of amplitude-suppressed data symbols according to some implementations.

The first equalizer 740 performs equalization on the A-S symbols 702 to produce equalized A-S (EAS) symbols 703. FIG. 8A shows a quadrature phase shift keying (QPSK) constellation 800 depicting an example mapping of amplitude-suppressed data symbols (such as the EAS symbols 703). As shown in FIG. 8A, the EAS symbols 703 may have relatively poor (or high) EVM as a result of the peak suppression performed at the transmitting device. However, in some instances, the receiving device may still be able to recover the original TX data from the EAS symbols 703 (through demodulation and decoding). In some other instances, the receiving device may be unable to recover the original TX data from the EAS symbols 703. In such instances, the receiving device may send a NACK message back to the transmitting device to request retransmission of the TX data. In some implementations, the HARQ processor 790 may store or buffer the EAS symbols 703 so that the peaks can be reconstructed based on peak suppression information included with a subsequent retransmission.

Figure 8B:
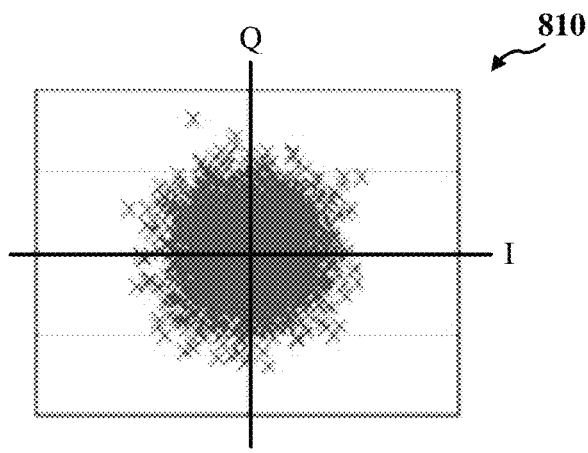
FIG. 8B shows a constellation depicting an example mapping of peak suppression symbols according to some implementations.

The second equalizer 742 performs equalization on the PS symbols 704 to produce equalized PS (EPS) symbols 705. FIG. 8B shows a QPSK constellation 810 depicting an example mapping of peak suppression symbols (such as the PS symbols 705). The demodulator 750 demodulates (or demaps) the EPS symbols 705, in accordance with a digital modulation scheme (such as PSK or QPSK), to produce a peak suppression information message (PSIM) 706. More specifically, the demodulator 750 may reverse the modulation performed by the modulator 460 of FIG. 4. The PSIM decoder 760 decodes the PSIM 706 to recover peak suppression (PS) information 707. As described with reference to FIG. 4, the PS information 707 may indicate the positions, amplitudes, or phases of one or more peaks in a previously-received sequence of A-S symbols 702 (such as from a prior transmission or retransmission associated with a HARQ sequence). In some implementations, information in the PSIM 706 may be compressed. Accordingly, the PSIM decoder 760 may recover the PS information 707 by reversing any compression performed by the PSIM generator 560 of FIG. 5.

The peak generator 770 is configured to recreate one or more peaks 708 based on the PS information 707. Each of the peaks 708 may correspond to a respective sample of the original data signal having an amplitude that exceeds a threshold amplitude level. In some implementations, the peak generator 770 may recreate the peaks 708 in a manner such that they can be substituted for corresponding samples in the previously-received A-S data signal. For example, the amplitude of each peak 708 may represent the peak amplitude of the corresponding sample from the original data signal. In some other implementations, the peak generator 770 may recreate the peaks 708 in a manner such that they can be combined or added to corresponding samples in the previously-received A-S data signal. For example, the amplitude of each peak 708 may represent a difference between the peak amplitude and the suppressed amplitude of the corresponding sample. The second FFT 780 converts the peaks 708 from the time domain back to the frequency domain. For example, the FFT 780 may produce a series frequency-domain (FD) peaks 718 representative of the peaks 708 generated by the peak generator 770.

In some implementations, the HARQ sequence processor 790 may combine the FD peaks 718 with previously-received EAS symbols 703 (such as from a prior transmission or retransmission associated with a given HARQ process) to produce reconstructed data symbols 709. With reference for example to FIG. 5, the reconstructed data symbols 709 may correspond to the original data symbols 502 to be transmitted by the signal processing chain 500. The manner in which the EAS symbols 703 and the FD peaks 718 are combined may depend on how the peaks 708 are generated. For example, if the amplitudes of the peaks 708 represent full peak amplitudes, the HARQ processor 790 may substitute (or replace) the FD peaks 718 in place of corresponding samples in the EAS symbols 703. On the other hand, if the amplitudes of the peaks 708 represent differences between the peak amplitudes and the suppressed amplitudes, the HARQ processor 790 may add the FD peaks 718 to the corresponding samples in the EAS symbols 703.

Figure 8C:
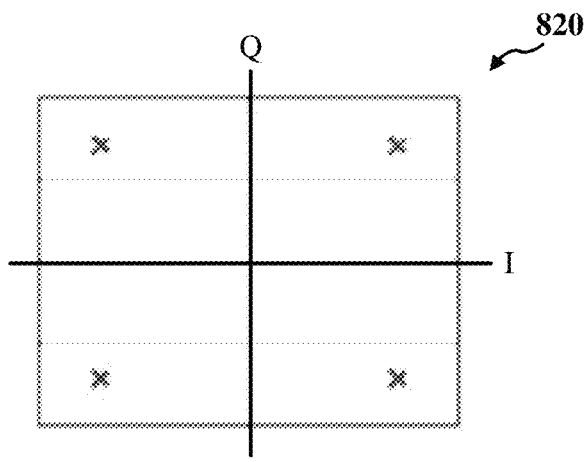
FIG. 8C shows a constellation depicting an example mapping of reconstructed data symbols according to some implementations.

FIG. 8C shows a QPSK constellation 820 depicting an example mapping of reconstructed data symbols (such as the reconstructed data symbols 709). As shown in FIG. 8C, the EVM associated with each point in the constellation 820 is significantly smaller than the EVM associated with each point in the constellation 800 of FIG. 8A. Thus, the reconstructed data symbols 709 may be precisely and accurately demodulated and decoded to recover the original bits of transmitted data. By combining peak suppression information with amplitude-suppressed data signals, aspects of the present disclosure may reduce the power consumption of the transmitting device while maintaining low EVM at the receiving device. In some implementations, the RX chain 700 may receive additional A-S symbols 702 in the same retransmission as the PS symbols 704. The additional A-S symbols 702 may represent additional coded bits of TX data that can be combined with the coded bits of the previously-received A-S symbols for improved coding gain. In this manner, the combination of PS symbols 704 and additional A-S symbols 702 may significantly reduce the likelihood or frequency of retransmissions for a given HARQ process.

MIMO implementations of the RX chain 700 may additionally include an SS demapper 745 and a number (N) of first FFTs 720. For MIMO implementations, the RX chain 700 may perform substantially the same operations as the non-MIMO implementations of the RX chain 700 on multiple concurrent or parallel streams of OFDM symbols 701. For example, the N FFTs 720 may simultaneously convert N parallel streams of OFDM symbols 701 to N parallel streams of FD symbols 711, respectively. The RE demapper 730 may parse PS symbols 704 and N streams of A-S symbols 702 from the N streams of FD symbols 711, and the first equalizer 740 may perform equalization on the N streams of A-S symbols 702 to produce N streams of EAS symbols 703, respectively. The SS demapper 745 converts the N streams of EAS symbols 703 to a single sequence of EAS symbols 703'. More specifically, the SS demapper 745 reverses the spatial stream mapping performed by the SS mapper 520 of FIG. 5. In some implementations, the SS demapper 745 may apply an inverse of the precoding matrix 522 to a number (N) of parallel streams of EAS symbols 703 to produce an unweighted sequence of EAS symbols 703'.

In some implementations, the receiving device may indicate to the transmitting device that is capable of decoding or otherwise interpreting the PS symbols 904 (or PSIM 906) prior to receiving the OFDM symbols 901. For example, the receiving device may transmit capability information, to the transmitting device, indicating its ability to receive or decode PS symbols 904 (or A-S symbols 902). As described with respect to FIG. 4, the capability information may be provided as a capability bit in an RRC message sent from the receiving device to the transmitting device. In some other implementations, the receiving device may receive capability information, from the transmitting device, indicating that the transmitting device is able to transmit or generate PS symbols 904 (or A-S symbols 902). For example, such capability information also may be provided as a capability bit in an RRC message sent by the transmitting device to the receiving device.

Figure 9:
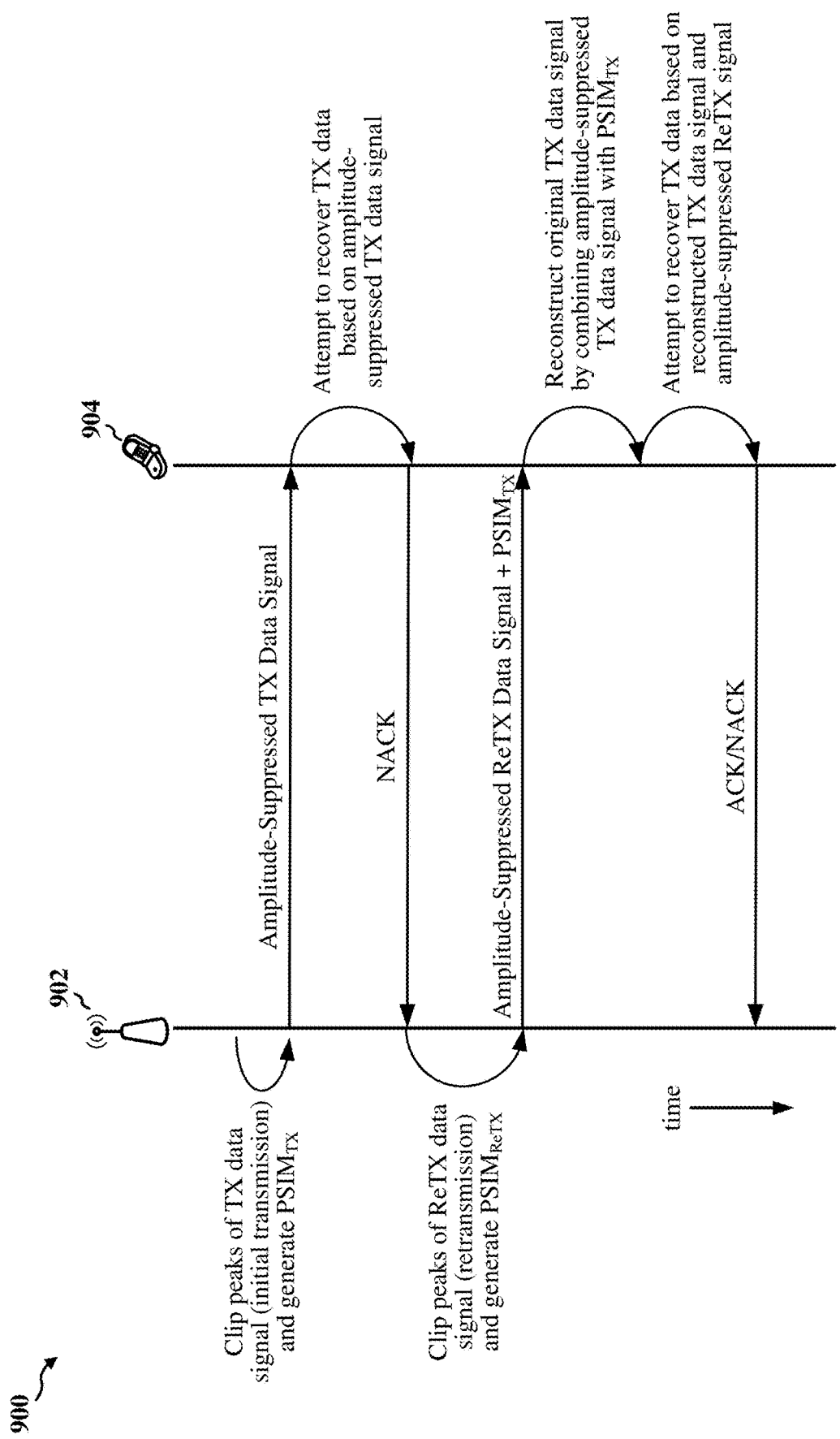
FIG. 9 shows a sequence diagram depicting an example message exchange between a base station and a UE according to some implementations.

FIG. 9 shows a sequence diagram depicting an example message exchange 900 between a base station 902 and a UE 904 according to some implementations. In some implementations, the base station 902 and UE 904 may be examples of the base station 102 and UE 104, respectively, of FIG. 1. The base station 902 may be any suitable base station or node including, for example, a gNB or an eNB. Although not shown, for simplicity, the base station 902 may include a multitude of antennas that can be configured to wireless transmit or receive information on a plurality of different beams, for example, to facilitate MIMO communications and beamforming.

In the example of FIG. 9, the base station 902 may initiate a HARQ process with the UE 904. For example, the base station 902 may select one or more coded bits to be transmitted, as a TX signal, to the receiving device. The TX data signal may represent an initial transmission associated with the HARQ process. In some implementations, the base station 902 may clip the peaks of the TX data signal, to produce an amplitude-suppressed TX data signal, and may generate a PSIM describing the clipped peaks ($PSIM_{TX}$). With reference for example to FIG. 4, the amplitude-suppressed TX data signal and $PSIM_{TX}$ may represent an A-S data signal 406 and PSIM 409, respectively, generated by the signal processing chain 430 based on a given HARQ sequence 404. In some implementations, the base station 902 may transmit the amplitude-suppressed TX data signal (without $PSIM_{TX}$) to the UE 904.

The UE 904 attempts to recover the TX data from the amplitude-suppressed TX data signal. For example, the UE 904 may demodulate the amplitude-suppressed TX data signal (based on a PSK or QAM modulation scheme) to recover a sequence of coded bits, and may decode the coded bits (based on a FEC code) to recover the TX data. In the example of FIG. 9, the UE 904 fails to recover the TX data based on the amplitude-suppressed TX data signal and transmits a NACK message back to the base station 902. After receiving the NACK, the base station 902 may process a retransmission for the corresponding HARQ process. For example, the base station 902 may select one or more additional coded bits to be retransmitted, as a ReTX data signal, to the receiving device. The ReTX data signal may represent a retransmission associated with the HARQ process.

In some implementations, the base station 902 may clip the peaks of the ReTX data signal, to produce an amplitude-suppressed ReTX data signal, and may generate a PSIM describing the clipped peaks ($PSIM_{ReTX}$). With reference for example to FIG. 4, the amplitude-suppressed ReTX data signal and $PSIM_{ReTX}$ may represent an A-S data signal 406 and PSIM 409, respectively, generated by the signal processing chain 430 based on another HARQ sequence 404. In some implementations, the base station 902 may transmit the amplitude-suppressed ReTX data signal with the PSIM associated with the previously-transmitted TX data signal ($PSIM_{TX}$) to the UE 904. For example, the amplitude-suppressed ReTX data signal and $PSIM_{TX}$ may be carried on one or more OFDM symbols of the same OFDM subframe.

The UE 904 may reconstruct the original TX data signal by combining the amplitude-suppressed TX data signal with $PSIM_{TX}$. With reference for example to FIG. 7, the HARQ processor 790 may reconstruct the peaks of the amplitude-suppressed TX data signal based on peak suppression information associated with one or more peaks in $PSIM_{TX}$. The UE 904 may further attempt to recover the TX data from the reconstructed TX data signal and the amplitude-suppressed ReTX data signal. For example, the UE 904 may demodulate the reconstructed TX data signal to recover a first sequence of coded bits and may demodulate the amplitude-suppressed ReTX data signal to recover a second sequence of coded bits. The UE 904 may combine the first and second sequence of coded bits using soft combining techniques and may decode the combined sequence of coded bits to recover the TX data.

The UE 904 may transmit an ACK or NACK message back to the base station 902 depending on whether it is able to successfully recover the TX data. If the base station 902 receives another NACK message from the UE 904, the base station 902 may repeat the retransmission process described above. For example, the base station 902 may select another set of coded bits to be retransmitted, as a ReTX2 data signal, to the receiving device. In some implementations, the base station 902 may clip the peaks of the ReTX2 data signal, to produce an amplitude-suppressed ReTX2 data signal, and may generate a PSIM describing the clipped peaks ($PSIM_{ReTX2}$). The base station 902 may transmit the amplitude-suppressed ReTX2 data signal with the PSIM associated with the previously-transmitted ReTX data signal ($PSIM_{ReTX}$) to the UE 904. In some implementations, the base station 902 may repeat this retransmission process until it receives an ACK message from the UE 904 or a maximum number of retransmissions has been reached.

Figure 10A:
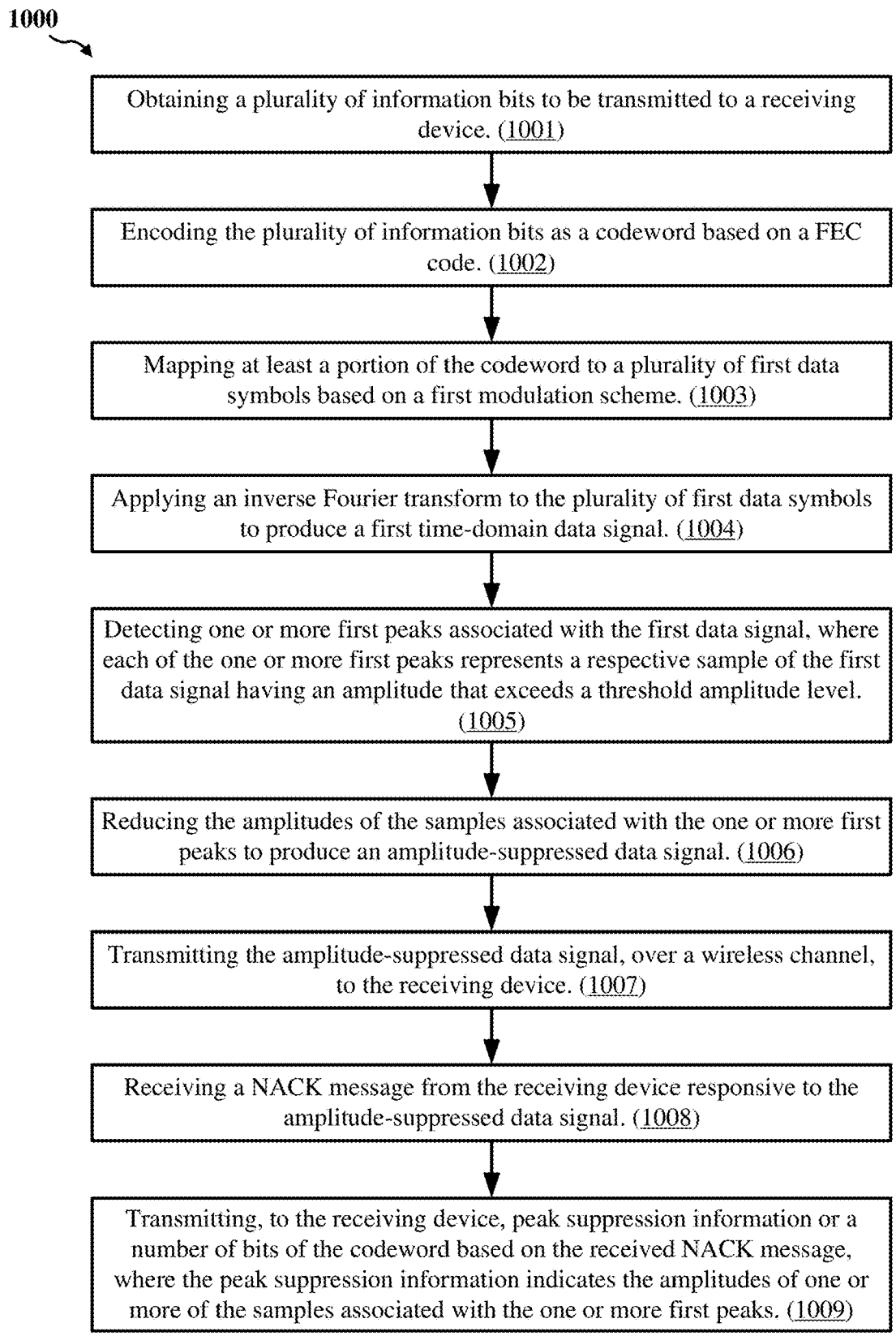
FIG. 10A shows a flowchart illustrating an example process for wireless communication that supports hybrid automatic repeat request (HARD) techniques for reducing peak-to-average power ratio (PAPR) according to some implementations.

FIG. 10A shows a flowchart illustrating an example process 1000 for wireless communication that supports HARQ techniques for reducing PAPR according to some implementations. In some implementations, the process 1000 may be performed by a wireless communication device operating as or within a network node, such as one of the base stations 102 or 310 described above with reference to FIGS. 1 and 3, respectively. In some other implementations, the process 1000 may be performed by a wireless communication device operating as or within a UE, such as one of the UEs 104 or 350 described above with respect to FIGS. 1 and 3, respectively.

In some implementations, the process 1000 begins in block 1001 with obtaining a plurality of information bits to be transmitted to a receiving device. In block 1002, the process 1000 proceeds with encoding the plurality of information bits as a codeword based on a FEC code. In block 1003, the process 1000 proceeds with mapping at least a portion of the codeword to a plurality of first data symbols based on a first modulation scheme. In block 1004, the process 1000 proceeds with applying an inverse Fourier transform to the plurality of first data symbols to produce a first time-domain data signal. In block 1005, the process 1000 proceeds with detecting one or more first peaks associated with the first data signal, where each of the one or more first peaks represents a respective sample of the first data signal having an amplitude that exceeds a threshold amplitude level. In some implementations, the threshold amplitude level may be determined based at least in part on an average transmit power associated with the first data signal and a target PAPR. In block 1006, the process 1000 proceeds with reducing the amplitudes of the samples associated with the one or more first peaks to produce an amplitude-suppressed data signal. In some implementations, the amplitudes of the samples associated with the one or more first peaks may be reduced to a first amplitude value that is less than or equal to the threshold amplitude level.

In block 1007, the process 1000 proceeds with transmitting the amplitude-suppressed data signal, over a wireless channel, to the receiving device. In block 1008, the process 1000 proceeds with receiving a NACK message from the receiving device responsive to the amplitude-suppressed data signal. In block 1009, the process 1000 proceeds with transmitting, to the receiving device, peak suppression information or a number of bits of the codeword based on the received NACK message, where the peak suppression information indicates the amplitudes of one or more of the samples associated with the one or more first peaks. In some implementations, the bits of the codeword may be selected based on a HARQ process. In some implementations, the peak suppression information may further indicate phases or positions of the samples associated with the one or more first peaks. In some aspects, the bits of the codeword may be transmitted without the peak suppression information response to the NACK message. In some other aspects, the bits of the codeword may be transmitted with the peak suppression information responsive to the NACK message.

Figure 10B:
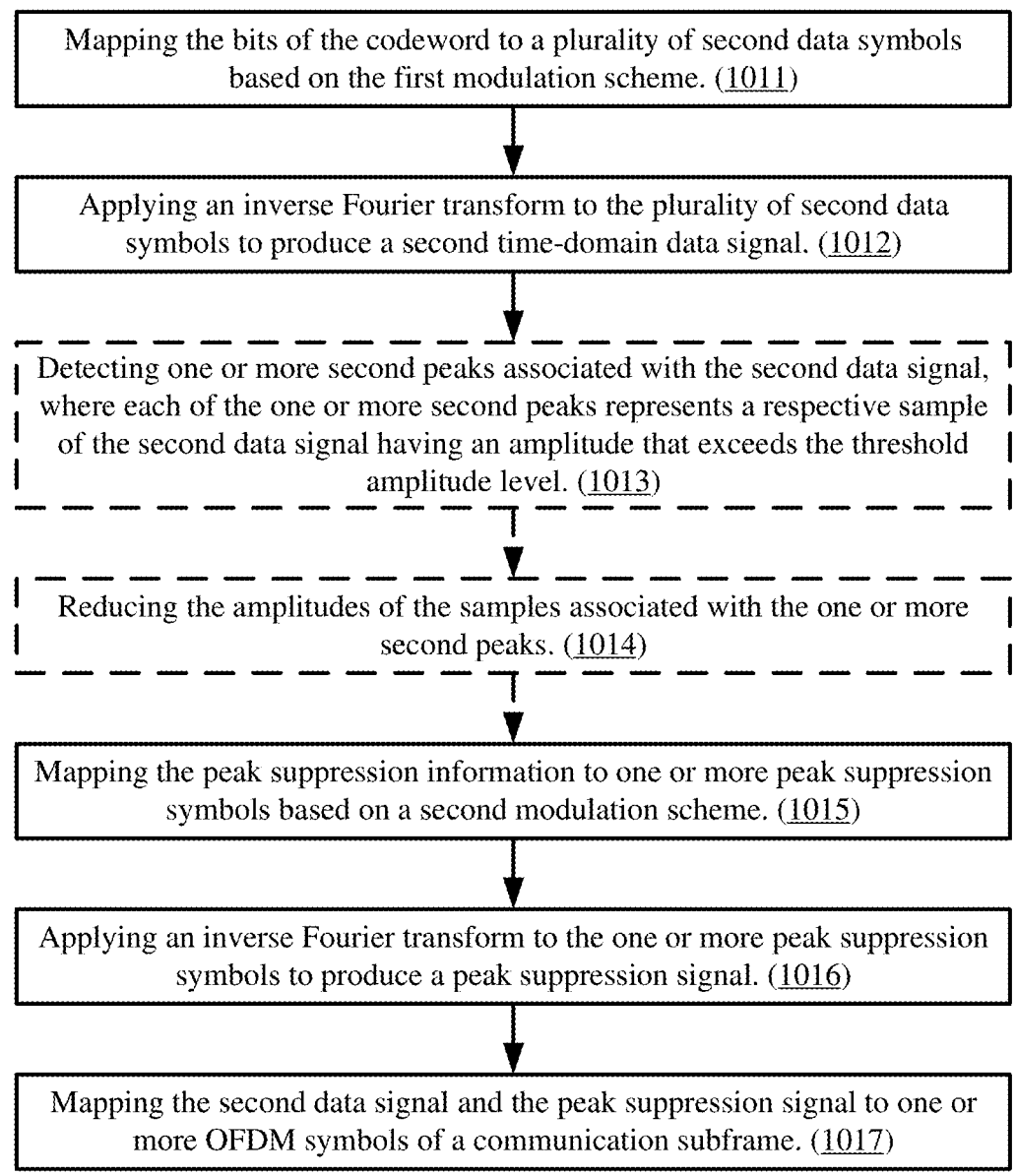
FIG. 10B shows a flowchart illustrating an example process for wireless communication that supports HARQ techniques for reducing PAPR according to some implementations.

FIG. 10B shows a flowchart illustrating an example process 1010 for wireless communication that supports HARQ techniques for reducing PAPR according to some implementations. In some implementations, the process 1010 may be performed by a wireless communication device operating as or within a network node, such as one of the base stations 102 or 310 described above with reference to FIGS. 1 and 3, respectively. In some other implementations, the process 1010 may be performed by a wireless communication device operating as or within a UE, such as one of the UEs 104 or 350 described above with respect to FIGS. 1 and 3, respectively.

With reference for example to FIG. 10A, the process 1010 may be a more detailed implementation of the transmission operation described in block 1009 of the process 1000. For example, the process 1010 may begin, in block 1011, after the reception of the NACK message in block 1008. In block 1011, the process 1010 begins by mapping the bits of the codeword to a plurality of second data symbols based on the first modulation scheme. In block 1012, the process 1010 proceeds with applying an inverse Fourier transform to the plurality of second data symbols to produce a second time-domain data signal. In some implementations, the process 1010 may proceed to block 1013 with detecting one or more second peaks associated with the second data signal, where each of the one or more second peaks represents a respective sample of the second data signal having an amplitude that exceeds the threshold amplitude level. In some implementations, the process 1010 may further proceed to block 1014 with reducing the amplitudes of the samples associated with the one or more second peaks. In block 1015, the process 1010 proceeds with mapping the peak suppression information to one or more peak suppression symbols based on a second modulation scheme. In block 1016, the process 1010 proceeds with applying an inverse Fourier transform to the one or more peak suppression symbols to produce a peak suppression signal. In block 1017, the process 1010 proceeds with mapping the second data signal and the peak suppression signal to one or more OFDM symbols of a communication subframe.

Figure 10C:
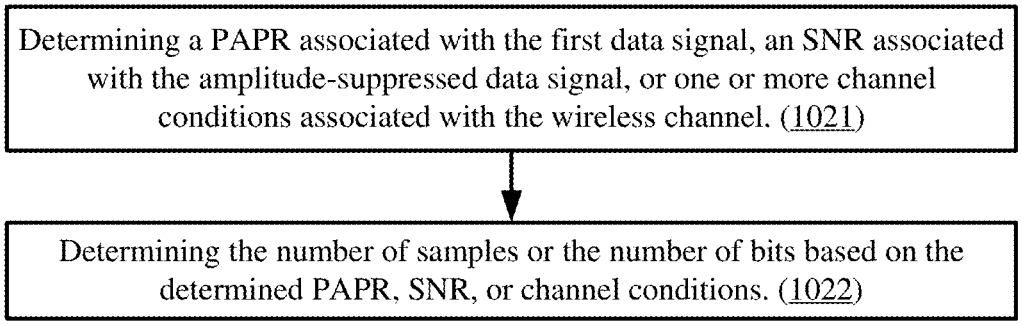
FIG. 10C shows a flowchart illustrating an example process for wireless communication that supports HARQ techniques for reducing PAPR according to some implementations.

FIG. 10C shows a flowchart illustrating an example process 1020 for wireless communication that supports HARQ techniques for reducing PAPR according to some implementations. In some implementations, the process 1020 may be performed by a wireless communication device operating as or within a network node, such as one of the base stations 102 or 310 described above with reference to FIGS. 1 and 3, respectively. In some other implementations, the process 1020 may be performed by a wireless communication device operating as or within a UE, such as one of the UEs 104 or 350 described above with respect to FIGS. 1 and 3, respectively.

In some implementations, the process 1020 may begin, in block 1021, after the application of the inverse Fourier transform to the plurality of second data symbols in block 1012 of the process 1010 and before the mapping of the second data signal and the peak suppression signal to one or more OFDM symbols in block 1017 of the process 1010. In block 1021, the process 1020 begins by determining a PAPR associated with the first data signal, an SNR associated with the amplitude-suppressed data signal, or one or more channel conditions associated with the wireless channel. In block 1022, the process 1020 proceeds with determining the number of samples or the number of bits based on the determined PAPR, SNR, or channel conditions.

Figure 11A:
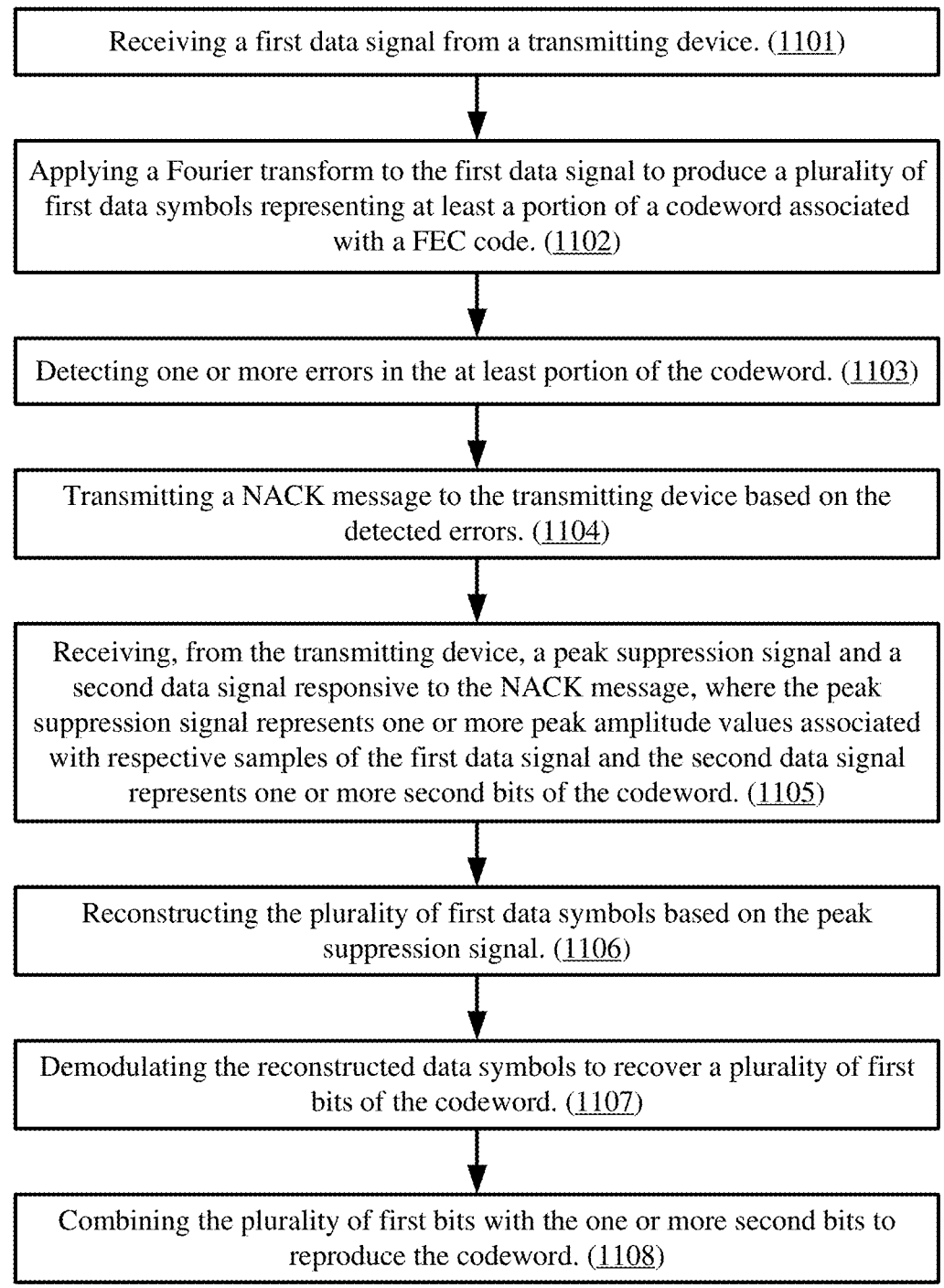
FIG. 11A shows a flowchart illustrating an example process for wireless communication that supports HARQ techniques for reducing PAPR according to some implementations.

FIG. 11A shows a flowchart illustrating an example process 1100 for wireless communication that supports HARQ techniques for reducing PAPR according to some implementations. In some implementations, the process 1100 may be performed by a wireless communication device operating as or within a network node, such as one of the base stations 102 or 310 described above with reference to FIGS. 1 and 3, respectively. In some other implementations, the process 1100 may be performed by a wireless communication device operating as or within a UE, such as one of the UEs 104 or 350 described above with respect to FIGS. 1 and 3, respectively.

In some implementations, the process 1100 begins in block 1101 with receiving a first data signal from a transmitting device. In block 1102, the process 1100 proceeds with applying a Fourier transform to the first data signal to produce a plurality of first data symbols representing at least a portion of a codeword associated with a FEC code. In block 1103, the process 1100 proceeds with detecting one or more errors in the at least portion of the codeword. In block 1104, the process 1100 proceeds with transmitting a NACK message to the transmitting device based on the detected errors.

In block 1105, the process 1100 proceeds with receiving, from the transmitting device, a peak suppression signal and a second data signal responsive to the NACK message, where the peak suppression signal represents one or more peak amplitude values associated with respective samples of the first data signal and the second data signal represents one or more second bits of the codeword. In some implementations, the peak suppression information may further indicate phases or positions of the respective samples of the first data signal. In some implementations, the one or more peak amplitude values may represent amplitudes that exceed a threshold amplitude level.

In block 1106, the process 1100 proceeds with reconstructing the plurality of first data symbols based on the peak suppression signal. In block 1107, the process 1100 proceeds with demodulating the reconstructed data symbols to recover a plurality of first bits of the codeword. In block 1108, the process 1100 proceeds with combining the plurality of first bits with the one or more second bits to reproduce the codeword. In some implementations, the plurality of first bits and the one or more second bits may be combined based on a HARQ process.

FIG. 11B shows a flowchart illustrating an example process 1110 for wireless communication that supports HARQ techniques for reducing PAPR according to some implementations. In some implementations, the process 1110 may be performed by a wireless communication device operating as or within a network node, such as one of the base stations 102 or 310 described above with reference to FIGS. 1 and 3, respectively. In some other implementations, the process 1110 may be performed by a wireless communication device operating as or within a UE, such as one of the UEs 104 or 350 described above with respect to FIGS. 1 and 3, respectively.

With reference for example to FIG. 11A, the process 1110 may be a more detailed implementation of the reconstructing operation described in block 1106 of the process 1100. For example, the process 1110 may begin, in block 1111, after the reception of the peak suppression signal and the data signal in block 1105 and before the demodulation of the reconstructed data symbols in block 1107. In block 1111, the process 1110 begins by applying a Fourier transform to the peak suppression signal to produce one or more peak suppression symbols. In block 1112, the process 1110 proceeds with demodulating the peak suppression symbols to recover peak suppression information indicating the one or more peak amplitude values. In block 1113, the process 1110 proceeds with recreating the samples associated with the one or more peak amplitude values indicated in the peak suppression information. In block 1114, the process 1110 proceeds with applying a Fourier transform to the recreated samples to produce a portion of the reconstructed data symbols.

Figure 12:
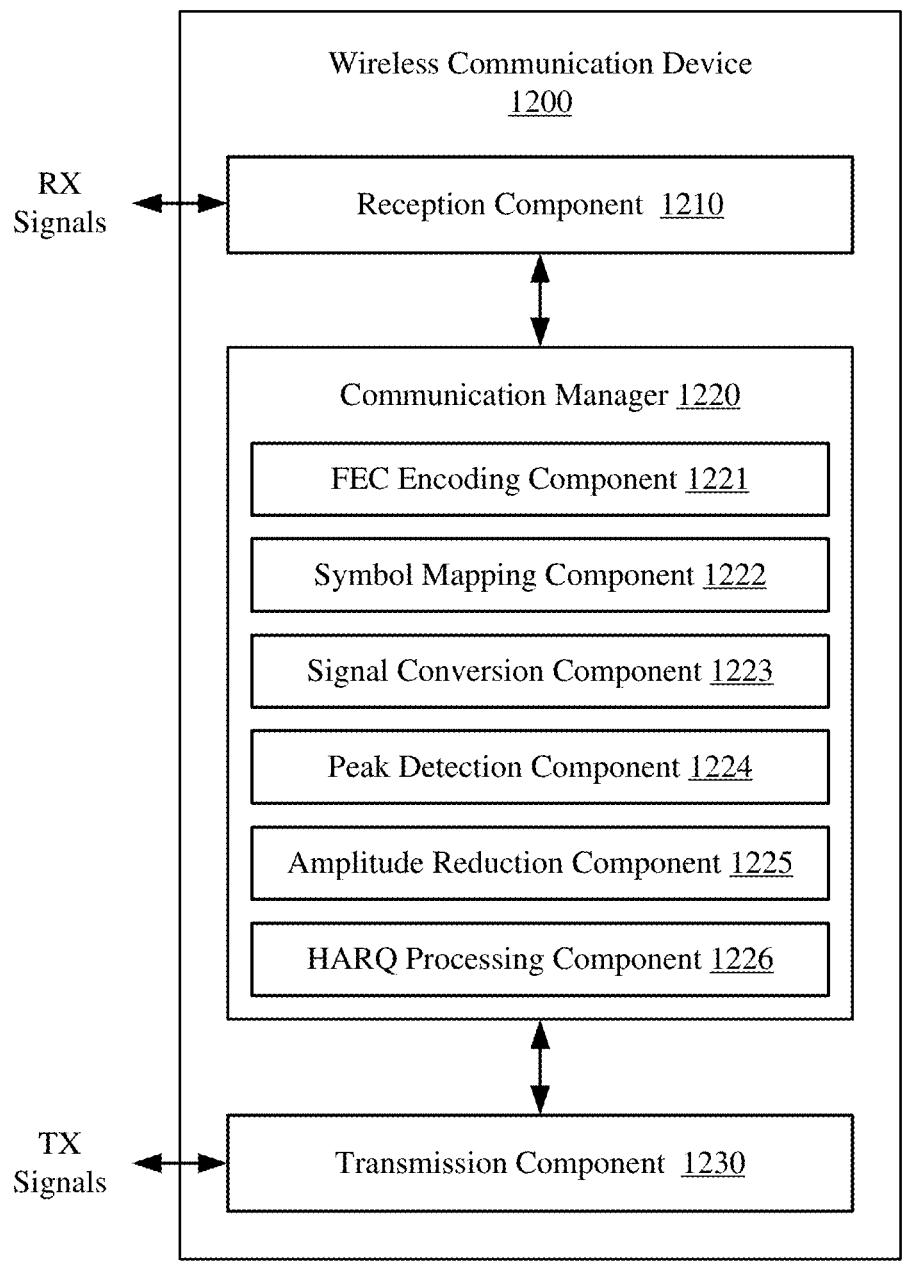
FIG. 12 shows a block diagram of an example wireless communication device according to some implementations.

FIG. 12 shows a block diagram of an example wireless communication device 1200 according to some implementations. In some implementations, the wireless communication device 1200 is configured to perform any of the processes 1000-1020 described above with reference to FIGS. 10A-10C, respectively. The wireless communication device 1200 can be an example implementation of any of the base stations 102 or 310 or any of the UEs 104 or 350 described above with reference to FIGS. 1 and 3. For example, the wireless communication device 1200 can be a chip, SoC, chipset, package or device that includes at least one processor and at least one modem (for example, a Wi-Fi (IEEE 802.11) modem or a cellular modem).

The wireless communication device 1200 includes a reception component 1210, a communication manager 1220, and a transmission component 1230. The communication manager 1220 further includes FEC encoding component 1221, a symbol mapping component 1222, a signal conversion component 1223, a peak detection component 1224, an amplitude reduction component 1225, and a HARQ processing component 1226. Portions of one or more of the components 1221, 1222, 1223, 1224, 1225, and 1226 may be implemented at least in part in hardware or firmware. In some implementations, at least some of the components 1221, 1222, 1223, 1224, 1225, or 1226 are implemented at least in part as software stored in a memory (such as the memory 376 or 360). For example, portions of one or more of the components 1221, 1222, 1223, 1224, 1225, and 1226 can be implemented as non-transitory instructions (or "code") executable by a processor (such as the controller/processor 375 or 359) to perform the functions or operations of the respective component.

The reception component 1210 is configured to receive RX signals from a receiving device. The transmission component 1230 is configured to transmit TX signals to the receiving device. In some implementations, the TX signals may include an amplitude-suppressed data signal and the RX signals may include a NACK message transmitted by the receiving device in response to the amplitude-suppressed data signal. In some implementations, the TX signals may include peak suppression information or a number of bits of the codeword transmitted to the receiving device based on the received NACK message, where the peak suppression information indicates the amplitudes of a number of the samples associated with the one or more first peaks.

The communication manager 1220 is configured to control or manage communications with the receiving device. In some implementations, the FEC encoding component 1221 may obtain a plurality of information bits to be transmitted to the receiving device and encode the plurality of information bits as a codeword based on a FEC code; the symbol mapping component 1222 may map at least a portion of the codeword to a plurality of first data symbols based on a first modulation scheme; the signal conversion component 1223 may apply an inverse Fourier transform to the plurality of first data symbols to produce a first time-domain data signal; the peak detection component 1224 may detect one or more first peaks associated with the first data signal, where each of the one or more first peaks represents a respective sample of the first data signal having an amplitude that exceeds a threshold amplitude level; the amplitude reduction component 1225 may reduce the amplitudes of the samples associated with the one or more first peaks to produce the amplitude-suppressed data signal; and the HARQ processing component 1226 may determine the peak suppression information or the number of bits of the codeword to be transmitted to the receiving device responsive to the NACK message.

Figure 13:
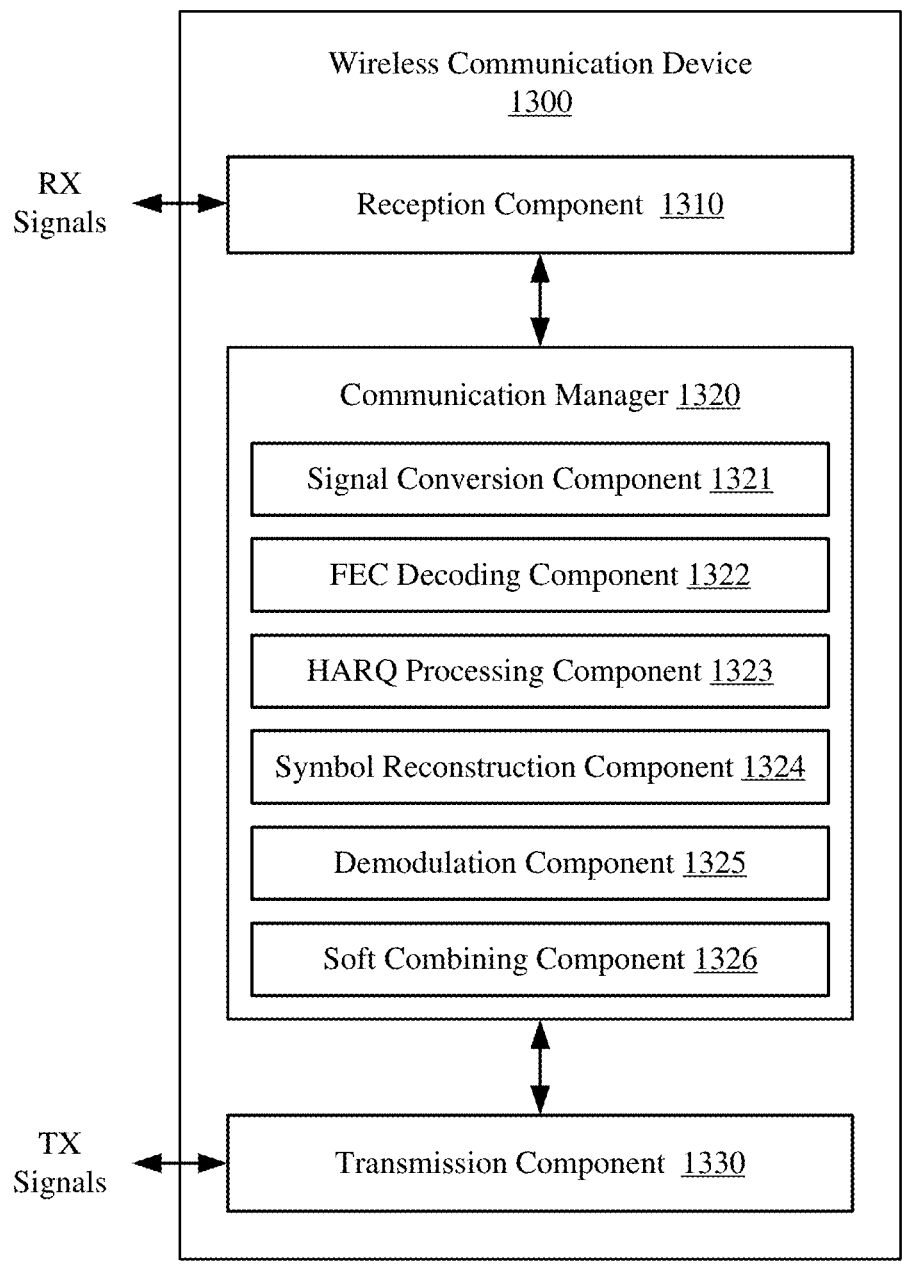
FIG. 13 shows a block diagram of an example wireless communication device according to some implementations.

FIG. 13 shows a block diagram of an example wireless communication device 1300 according to some implementations. In some implementations, the wireless communication device 1300 is configured to perform any of the processes 1100 or 1110 described above with reference to FIGS. 11A and 11B, respectively. The wireless communication device 1300 can be an example implementation of any of the base stations 102 or 310 or any of the UEs 104 or 350 described above with reference to FIGS. 1 and 3. For example, the wireless communication device 1300 can be a chip, SoC, chipset, package or device that includes at least one processor and at least one modem (for example, a Wi-Fi (IEEE 802.11) modem or a cellular modem).

The wireless communication device 1300 includes a reception component 1310, a communication manager 1320, and a transmission component 1330. The communication manager 1320 further includes a signal conversion component 1321, a FEC decoding component 1322, a HARQ processing component 1323, a symbol reconstruction component 1324, a demodulation component 1325, and a soft combining component 1326. Portions of one or more of the components 1321, 1322, 1323, 1324, 1325, and 1326 may be implemented at least in part in hardware or firmware. In some implementations, at least some of the components 1321, 1322, 1323, 1324, 1325, or 1326 are implemented at least in part as software stored in a memory (such as the memory 376 or 360). For example, portions of one or more of the components 1321, 1322, 1323, 1324, 1325, and 1326 can be implemented as non-transitory instructions (or "code") executable by a processor (such as the controller/processor 375 or 359) to perform the functions or operations of the respective component.

The reception component 1310 is configured to receive RX signals from a transmitting device. The transmission component 1330 is configured to transmit TX signals to the transmitting device. In some implementations, the RX signals may include a first data signal received from the transmitting device and the TX signals may include a NACK message transmitted to the transmitting device in response to the first data signal. In some other implementations, the RX signals may include a peak suppression signal and a second data signal received from the transmitting device in response to the NACK message, where the peak suppression signal represents one or more peak amplitude values associated with respective samples of the first data signal and the second data signal represents one or more second bits of the codeword.

The communication manager 1320 is configured to control or manage wireless communications with the transmitting device. In some implementations, the signal conversion component 1321 may apply a Fourier transform to the first data signal to produce a plurality of first data symbols representing at least a portion of a codeword associated with a FEC code; the FEC decoding component 1322 may detect one or more errors in the at least portion of the codeword; the HARQ processing component 1323 may generate the NACK message based on the detected errors; the symbol reconstruction component 1324 may reconstruct the plurality of first data symbols based on the peak suppression signal; the demodulation component 1325 may demodulate the reconstructed data symbols to recover a plurality of first bits of the codeword; and the soft combining component 1326 may combine the plurality of first bits with the one or more second bits to reproduce the codeword.

Implementation examples are described in the following numbered clauses:

1. A method of wireless communication, including:
   obtaining a plurality of information bits to be transmitted to a receiving device;
   encoding the plurality of information bits as a codeword based on a forward error correcting (FEC) code;
   mapping at least a portion of the codeword to a plurality of first data symbols based on a first modulation scheme;
   applying an inverse Fourier transform to the plurality of first data symbols to produce a first time-domain data signal;

detecting one or more first peaks associated with the first data signal, each of the one or more first peaks representing a respective sample of the first data signal having an amplitude that exceeds a threshold amplitude level;
reducing the amplitudes of the samples associated with the one or more first peaks to produce an amplitude-suppressed data signal;
transmitting the amplitude-suppressed data signal, over a wireless channel, to the receiving device;
receiving a negative acknowledgement (NACK) message from the receiving device responsive to the amplitude-suppressed data signal; and
transmitting, to the receiving device, peak suppression information or a number of bits of the codeword based on the received NACK message, the peak suppression information indicating the amplitudes of one or more of the samples associated with the one or more first peaks.

2. The method of clause 1, wherein the peak suppression information further indicates phases or positions of the samples associated with the one or more first peaks.

3. The method of any of clauses 1 or 2, further including:
determining an average transmit power associated with the first data signal; and
determining the threshold amplitude level based at least in part on the average transmit power and a target peak-to-average power ratio (PAPR).

4. The method of any of clauses 1-3, wherein the amplitudes of the samples associated with the one or more first peaks are reduced to a first amplitude value that is less than or equal to the threshold amplitude level.

5. The method of any of clauses 1-4, wherein the bits of the codeword are transmitted without the peak suppression information responsive to the NACK message.

6. The method of any of clauses 1-4, wherein the bits of the codeword are transmitted with the peak suppression information responsive to the NACK message.

7. The method of any of clauses 1-4 or 6, wherein the transmitting of the bits of the codeword with the peak suppression information includes:
mapping the bits of the codeword to a plurality of second data symbols based on the first modulation scheme;
applying an inverse Fourier transform to the plurality of second data symbols to produce a second time-domain data signal;
mapping the peak suppression information to one or more peak suppression symbols based on a second modulation scheme;
applying an inverse Fourier transform to the one or more peak suppression symbols to produce a peak suppression signal; and
mapping the second data signal and the peak suppression signal to one or more orthogonal frequency-division multiplexing (OFDM) symbols of a communication subframe.

8. The method of any of clauses 1-4, 6, or 7, further including:
detecting one or more second peaks associated with the second data signal, each of the one or more second peaks representing a respective sample of the second data signal having an amplitude that exceeds the threshold amplitude level; and
reducing the amplitudes of the samples associated with the one or more second peaks prior to mapping the second data signal to the one or more OFDM symbols of the communication subframe.

9. The method of any of clauses 1-8, wherein the transmitting of the peak suppression information or the number of bits of the codeword includes:
determining a PAPR associated with the first data signal, a signal-to-noise ratio (SNR) associated with the amplitude-suppressed data signal, or one or more channel conditions associated with the wireless channel; and
determining the number of samples or the number of bits based on the determined PAPR, SNR, or channel conditions.

10. The method of any of clauses 1-9, further including:
selecting the bits of the codeword based on a hybrid automatic repeat request (HARQ) process.

11. A wireless communication device including:
at least one modem;
at least one processor communicatively coupled with the at least one modem; and
at least one memory communicatively coupled with the at least one processor and storing processor-readable code that, when executed by the at least one processor in conjunction with the at least one modem, is configured to perform the method of any one or more of clauses 1-10.

12. A method of wireless communication, including:
receiving a first data signal from a transmitting device;
applying a Fourier transform to the first data signal to produce a plurality of first data symbols representing at least a portion of a codeword associated with a forward error correcting (FEC) code;
detecting one or more errors in the at least portion of the codeword;
transmitting a negative acknowledgement (NACK) message to the transmitting device based on the detected errors;
receiving, from the transmitting device, a peak suppression signal and a second data signal responsive to the NACK message, the peak suppression signal representing one or more peak amplitude values associated with respective samples of the first data signal, the second data signal representing one or more second bits of the codeword;
reconstructing the plurality of first data symbols based on the peak suppression signal;
demodulating the reconstructed data symbols to recover a plurality of first bits of the codeword; and
combining the plurality of first bits with the one or more second bits to reproduce the codeword.

13. The method of clause 12, wherein the peak suppression information further indicates phases or positions of the respective samples of the first data signal.

14. The method of any of clauses 12 or 13, wherein the one or more peak amplitude values represent amplitudes that exceed a threshold amplitude level.

15. The method of any of clauses 12-14, wherein the reconstructing of the plurality of first data symbols includes:
applying a Fourier transform to the peak suppression signal to produce one or more peak suppression symbols;
demodulating the peak suppression symbols to recover peak suppression information indicating the one or more peak amplitude values;
recreating the samples associated with the one or more peak amplitude values indicated in the peak suppression information; and
applying a Fourier transform to the recreated samples to produce a portion of the reconstructed data symbols.

16. The method of any of clauses 12-15, wherein the plurality of first bits and the one or more second bits are combined based on a hybrid automatic repeat request (HARQ) process.

17. A wireless communication device including:
  at least one modem;
  at least one processor communicatively coupled with the at least one modem; and
  at least one memory communicatively coupled with the at least one processor and storing processor-readable code that, when executed by the at least one processor in conjunction with the at least one modem, is configured to perform the method of any one or more of clauses 12-16.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method of wireless communication, comprising:
  obtaining a plurality of information bits to be transmitted to a receiving device;
  encoding the plurality of information bits as a codeword based on a forward error correcting (FEC) code;
  mapping at least a portion of the codeword to a plurality of first data symbols based on a first modulation scheme;
  applying an inverse Fourier transform to the plurality of first data symbols to produce a first time-domain data signal;
  detecting one or more first peaks associated with the first data signal, each of the one or more first peaks representing a respective sample of the first data signal having an amplitude that exceeds a threshold amplitude level;
  reducing the amplitudes of the samples associated with the one or more first peaks to produce an amplitude-suppressed data signal;
  transmitting the amplitude-suppressed data signal, over a wireless channel, to the receiving device;
  receiving a negative acknowledgement (NACK) message from the receiving device responsive to the amplitude-suppressed data signal; and
  transmitting, to the receiving device, peak suppression information or a number of bits of the codeword based on the received NACK message, the peak suppression information indicating the amplitudes of one or more of the samples associated with the one or more first peaks.

2. The method of claim 1, wherein the peak suppression information further indicates phases or positions of the samples associated with the one or more first peaks.

3. The method of claim 1, further comprising:
  determining an average transmit power associated with the first data signal; and
  determining the threshold amplitude level based at least in part on the average transmit power and a target peak-to-average power ratio (PAPR).

4. The method of claim 1, wherein the amplitudes of the samples associated with the one or more first peaks are reduced to a first amplitude value that is less than or equal to the threshold amplitude level.

5. The method of claim 1, wherein the bits of the codeword are transmitted without the peak suppression information responsive to the NACK message.

6. The method of claim 1, wherein the bits of the codeword are transmitted with the peak suppression information responsive to the NACK message.

7. The method of claim 6, wherein the transmitting of the bits of the codeword with the peak suppression information comprises:
  mapping the bits of the codeword to a plurality of second data symbols based on the first modulation scheme;
  applying an inverse Fourier transform to the plurality of second data symbols to produce a second time-domain data signal;

mapping the peak suppression information to one or more peak suppression symbols based on a second modulation scheme;

applying an inverse Fourier transform to the one or more peak suppression symbols to produce a peak suppression signal; and mapping the second data signal and the peak suppression signal to one or more orthogonal frequency-division multiplexing (OFDM) symbols of a communication subframe.

8. The method of claim 7, further comprising:

detecting one or more second peaks associated with the second data signal, each of the one or more second peaks representing a respective sample of the second data signal having an amplitude that exceeds the threshold amplitude level; and reducing the amplitudes of the samples associated with the one or more second peaks prior to mapping the second data signal to the one or more OFDM symbols of the communication subframe.

9. The method of claim 1, wherein the transmitting of the peak suppression information or the number of bits of the codeword comprises:

determining a PAPR associated with the first data signal, a signal-to-noise ratio (SNR) associated with the amplitude-suppressed data signal, or one or more channel conditions associated with the wireless channel; and determining the number of samples or the number of bits based on the determined PAPR, SNR, or channel conditions.

10. The method of claim 1, further comprising:

selecting the bits of the codeword based on a hybrid automatic repeat request (HARQ) process.

11. A wireless communication device comprising:

at least one modem;

at least one processor communicatively coupled with the at least one modem; and at least one memory communicatively coupled with the at least one processor and storing processor-readable code that, when executed by the at least one processor in conjunction with the at least one modem, is configured to:

obtain a plurality of information bits to be transmitted to a receiving device;

encode the plurality of information bits as a codeword based on a forward error correcting (FEC) code;

map at least a portion of the codeword to a plurality of first data symbols based on a first modulation scheme;

apply an inverse Fourier transform to the plurality of first data symbols to produce a first time-domain data signal;

detect one or more first peaks associated with the first data signal, each of the one or more first peaks representing a respective sample of the first data signal having an amplitude that exceeds a threshold amplitude level;

reduce the amplitudes of the samples associated with the one or more first peaks to produce an amplitude-suppressed data signal;

transmit the amplitude-suppressed data signal, over a wireless channel, to the receiving device;

receive a negative acknowledgement (NACK) message from the receiving device responsive to the amplitude-suppressed data signal; and transmit, to the receiving device, peak suppression information or a number of bits of the codeword based on the received NACK message, the peak suppression information indicating the amplitudes of a number of the samples associated with the one or more first peaks.

12. The wireless communication device of claim 11, wherein the peak suppression information further indicates phases or positions of the samples associated with the one or more first peaks.

13. The wireless communication device of claim 11, wherein execution of the processor-readable code is further configured to:

determine an average transmit power associated with the first data signal; and determine the threshold amplitude level based at least in part on the average transmit power and a target peak-to-average power ratio (PAPR).

14. The wireless communication device of claim 11, wherein the amplitudes of the samples associated with the one or more first peaks are reduced to a first amplitude value that is less than or equal to the threshold amplitude level.

15. The wireless communication device of claim 11, wherein the bits of the codeword are transmitted without the peak suppression information responsive to the NACK message.

16. The wireless communication device of claim 11, wherein the bits of the codeword are transmitted with the peak suppression information responsive to the NACK message.

17. The wireless communication device of claim 16, wherein the transmitting of the bits of the codeword with the peak suppression information comprises:

mapping the bits of the codeword to a plurality of second data symbols based on the first modulation scheme;

applying an inverse Fourier transform to the plurality of second data symbols to produce a second time-domain data signal;

mapping the peak suppression information to one or more peak suppression symbols based on a second modulation scheme;

applying an inverse Fourier transform to the one or more peak suppression symbols to produce a peak suppression signal; and mapping the second data signal and the peak suppression signal to one or more orthogonal frequency-division multiplexing (OFDM) symbols of a communication subframe.

18. The wireless communication device of claim 17, wherein execution of the processor-readable code is further configured to:

detect one or more second peaks associated with the second data signal, each of the one or more second peaks representing a respective sample of the second data signal having an amplitude that exceeds the threshold amplitude level; and reduce the amplitudes of the samples associated with the one or more second peaks prior to mapping the second data signal to the one or more OFDM symbols of the communication subframe.

19. The wireless communication device of claim 11, wherein the transmitting of the peak suppression information or the number of bits of the codeword comprises:

determining a PAPR associated with the data signal, a signal-to-noise ratio (SNR) associated with the amplitude-suppressed data signal, or one or more channel conditions associated with the wireless channel; and determining the number of samples or the number of bits based on the determined PAPR, SNR, or channel conditions.

20. The wireless communication device of claim 11, wherein execution of the processor-readable code is further configured to:
select the bits of the codeword based on a hybrid automatic repeat request (HARM) process.

21. A method of wireless communication, comprising:
receiving a first data signal from a transmitting device;
applying a Fourier transform to the first data signal to produce a plurality of first data symbols representing at least a portion of a codeword associated with a forward error correcting (FEC) code;
detecting one or more errors in the at least portion of the codeword;
transmitting a negative acknowledgement (NACK) message to the transmitting device based on the detected errors;
receiving, from the transmitting device, a peak suppression signal and a second data signal responsive to the NACK message, the peak suppression signal representing one or more peak amplitude values associated with respective samples of the first data signal, the second data signal representing one or more second bits of the codeword;
reconstructing the plurality of first data symbols based on the peak suppression signal;
demodulating the reconstructed data symbols to recover a plurality of first bits of the codeword; and
combining the plurality of first bits with the one or more second bits to reproduce the codeword.

22. The method of claim 21, wherein the peak suppression information further indicates phases or positions of the respective samples of the first data signal.

23. The method of claim 21, wherein the one or more peak amplitude values represent amplitudes that exceed a threshold amplitude level.

24. The method of claim 21, wherein the reconstructing of the plurality of first data symbols comprises:
applying a Fourier transform to the peak suppression signal to produce one or more peak suppression symbols;
demodulating the peak suppression symbols to recover peak suppression information indicating the one or more peak amplitude values;
recreating the samples associated with the one or more peak amplitude values indicated in the peak suppression information; and
applying a Fourier transform to the recreated samples to produce a portion of the reconstructed data symbols.

25. The method of claim 21, wherein the plurality of first bits and the one or more second bits are combined based on a hybrid automatic repeat request (HARQ) process.

26. A wireless communication device comprising:
at least one modem;
at least one processor communicatively coupled with the at least one modem; and
at least one memory communicatively coupled with the at least one processor and storing processor-readable code that, when executed by the at least one processor in conjunction with the at least one modem, is configured to:
receive a first data signal from a transmitting device;
apply a Fourier transform to the first data signal to produce a plurality of first data symbols representing at least a portion of a codeword associated with a forward error correcting (FEC) code;
detect one or more errors in the at least portion of the codeword;
transmit a first negative acknowledgement (NACK) message to the transmitting device based on the detected errors;
receive, from the transmitting device, a peak suppression signal and a second data signal responsive to the first NACK message, the peak suppression signal representing one or more peak amplitude values associated with respective samples of the first data signal, the second data signal representing one or more second bits of the codeword;
reconstruct the plurality of first data symbols based on the peak suppression signal;
demodulate the reconstructed data symbols to recover a plurality of first bits of the codeword; and
combine the plurality of first bits with the one or more second bits to reproduce the codeword.

27. The wireless communication device of claim 26, wherein the peak suppression information further indicates phases or positions of the respective samples of the first data signal.

28. The wireless communication device of claim 26, wherein the one or more peak amplitude values represent amplitudes that exceed a threshold amplitude level.

29. The wireless communication device of claim 26, wherein the reconstructing of the plurality of first data symbols comprises:
applying a Fourier transform to the peak suppression signal to produce one or more peak suppression symbols;
demodulating the peak suppression symbols to recover peak suppression information indicating the one or more peak amplitude values;
recreating the samples associated with the one or more peak amplitude values indicated in the peak suppression information; and
applying a Fourier transform to the recreated samples to produce a portion of the reconstructed data symbols.

30. The wireless communication device of claim 26, wherein the plurality of first bits and the one or more second bits are combined based on a hybrid automatic repeat request (HARQ) process.

* * * * *